(12) United States Patent
Kamei et al.

(10) Patent No.: US 9,569,311 B2
(45) Date of Patent: *Feb. 14, 2017

(54) COMPUTER SYSTEM FOR BACKING UP DATA

(71) Applicant: Hitachi, Ltd., Tokyo (JP)

(72) Inventors: Hitoshi Kamei, Sagamihara (JP); Takayuki Fukatani, Tokyo (JP); Tomonori Esaka, Yokohama (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,498

(22) Filed: Oct. 26, 2015

(65) Prior Publication Data
US 2016/0062844 A1 Mar. 3, 2016

Related U.S. Application Data

(63) Continuation of application No. 13/641,620, filed as application No. PCT/JP2012/006278 on Oct. 1, 2012, now Pat. No. 9,201,884.

(51) Int. Cl.
*G06F 11/14* (2006.01)
*G06F 17/30* (2006.01)

(52) U.S. Cl.
CPC ....... *G06F 11/1461* (2013.01); *G06F 11/1453* (2013.01); *G06F 11/1464* (2013.01); *G06F 17/3007* (2013.01); *G06F 17/3015* (2013.01); *G06F 17/30156* (2013.01);
(Continued)

(58) Field of Classification Search
CPC .............. G06F 11/1453; G06F 11/1461; G06F 11/1464; G06F 11/1469; G06F 17/3007; G06F 17/3015; G06F 17/30156; G06F 17/30215; G06F 2201/84
See application file for complete search history.

(56) References Cited

U.S. PATENT DOCUMENTS

| | | |
|---|---|---|
| 5,907,672 A | 5/1999 | Matze et al. |
| 6,625,625 B1 | 9/2003 | Kihara et al. |
| 7,386,752 B1 | 6/2008 | Rakic et al. |

(Continued)

FOREIGN PATENT DOCUMENTS

| | | |
|---|---|---|
| JP | 10-055298 | 2/1998 |
| JP | 2009-238036 A | 10/2009 |

(Continued)

*Primary Examiner* — Jorge A Casanova
(74) *Attorney, Agent, or Firm* — Volpe and Koenig, P.C.

(57) ABSTRACT

It is provided a computer system, comprising a server and first and second storage systems. The first storage system stores deduplicated data sharing at least a part of data with other data, shared data shared by a plurality of pieces of the deduplicated data, and first type data representing a type of the stored data including the deduplicated data and the shared data. The deduplicated data is associated with the shared data by a pointer to the shared data, and includes differential data indicating a difference from the shared data. The server creates second type data representing a type of the data stored in the second storage system from the first type data. The second storage system stores the shared data associated with the deduplicate data at a reading position before a position at which the deduplicated data is read in sequential reading and stores the second type data.

18 Claims, 18 Drawing Sheets

(52) U.S. Cl.
CPC .... *G06F 17/30215* (2013.01); *G06F 11/1469* (2013.01); *G06F 2201/84* (2013.01)

(56) References Cited

U.S. PATENT DOCUMENTS

| | | |
|---|---|---|
| 8,200,926 B1 | 6/2012 | Stringham |
| 8,204,862 B1 | 6/2012 | Paulzagade et al. |
| 8,606,751 B1 * | 12/2013 | Starling .............. G06F 11/1458 707/634 |
| 2007/0136540 A1 | 6/2007 | Matlock, Jr. |
| 2010/0299490 A1 | 11/2010 | Attarde et al. |
| 2010/0332456 A1 * | 12/2010 | Prahlad ............... G06F 17/3002 707/664 |
| 2012/0158666 A1 | 6/2012 | Anglin et al. |

FOREIGN PATENT DOCUMENTS

| | | |
|---|---|---|
| JP | 2012-133768 A | 7/2012 |
| WO | 2008/080140 A2 | 7/2008 |

\* cited by examiner

COMPUTER SYSTEM FOR BACKING UP DATA

CROSS REFERENCE TO RELATED APPLICATIONS

This application is a continuation of U.S. patent application Ser. No. 13/641,620, filed Oct. 16, 2012, which is a U.S. National Phase Application of International Application Serial No. PCT/JP2012/006278, filed Oct. 1, 2012, which is incorporated by reference as if fully set forth.

TECHNICAL FIELD

This invention relates to a method of managing data stored in storage.

BACKGROUND ART

In recent years, an amount of data stored in a file server is increasing rapidly. In order to reduce a data storing cost of the file server, a file-level deduplication function capable of reducing an amount of file data stored in the file server is attracting attention.

The file-level deduplication function is realized by extracting a group of duplicate files having duplicate data bodies from among file groups stored in a file system of the file server and deleting data bodies except for one data body to replace the data bodies with reference data. By sharing the one data body by a plurality of files, redundant data bodies stored in the file system may be deleted. Therefore, the amount of data stored in the file system may be reduced.

Meanwhile, as a countermeasure against a failure of the file server or a disaster, the data managed by the file system, to which the file-level deduplication has been applied, is backed up regularly to a tape device as before. For the backup, for example, the Network Data Management Protocol may be used.

For example, U.S. Pat. No. 8,204,862 B discloses a method for restoring deduplicated data. The method may include receiving a request to restore a set of deduplicated data segments to a client system, where each data segment in the set of deduplicated data segments is referred to by one or more deduplication references. The method may also include procuring reference data that indicates, for each data segment in the set of deduplicated data segments, the number of deduplication references that point to the data segment. The method may further include using the reference data to select one or more data segments from the set of deduplicated data segments for client-side caching, caching the one or more data segments in a cache on the client system, and restoring the one or more data segments from the cache on the client system. Various other methods, systems, and computer-readable media are also disclosed.

In addition, U.S. Pat. No. 8,200,926 B discloses a computer-implemented method for creating a full backup. The computer-implemented method may include creating a first full backup of a set of data units at a first time. The computer-implemented method may also include identifying one or more data units in the set of data units that have been modified since the first time. The computer-implemented method may further include creating a second full backup of the set of data units by providing copies of the one or more data units that have been modified since the first time and storing references to copies of one or more data units in the set of data units that have not been modified since the first time. The references may be configured such that the second full backup is a standalone backup that is independent of any other backups.

SUMMARY OF INVENTION

Technical Problem

According to the conventional technology described above, when an administrator of the file server uses the Network Data Management Protocol to back up the file system, to which the file-level deduplication has been applied, to a tape on a file level, the deduplicated state is released and the backup data takes the state before the deduplication.

On the other hand, when the technology described in U.S. Pat. No. 8,204,862 B is used, the files of the deduplicated file system may be backed up and restored in the deduplicated state. However, the technology described in U.S. Pat. No. 8,204,862 B does not take the characteristics of the tape device into account. Therefore, when the technology described in U.S. Pat. No. 8,204,862 B is applied to the backup and restoration using the tape device, seek operations of the tape device occur frequently in restoring the files. The seek operation of the tape refers to a process for cueing to the file to be accessed. The seek operation of the tape device takes long time, which leads to a problem of an elongated restore time.

The conventional technologies described above do not take the backup to the tape into account, and hence cannot solve such problem.

Therefore, it is an object of this invention to back up, in a file system to which file-level deduplication has been applied, files to a tape device in a deduplicated state, to thereby suppress seek operations of the tape device in restoration.

Solution to Problem

In a representative example of the invention disclosed in the subject application, a tape device stores, before deduplicated data, shared data associated with the deduplicated data.

That is a computer system, comprising: a server for providing data to a client computer; a first storage system for storing the data to be provided to the client computer; and a second storage system for backing up the data stored in the first storage system. The server includes a processor for executing a program and a memory for storing the program executed by the processor. The first storage system stores deduplicated data which shares at least a part of data with other data, shared data which is shared by a plurality of pieces of the deduplicated data, and first type data representing a type of the stored data including the deduplicated data and the shared data. The deduplicated data is associated with the shared data by a pointer to the shared data, and includes differential data indicating a difference from the shared data. The server creates second type data representing a type of the data stored in the second storage system from the first type data. The second storage system stores the shared data associated with the deduplicate data at a reading position before a position at which the deduplicated data is read in sequential reading, and stores the created second type data.

Advantageous Effects of Invention

According to the exemplary embodiment of this invention, the backup time and the restore time may be reduced.

DESCRIPTION OF EMBODIMENTS

Figure 1:
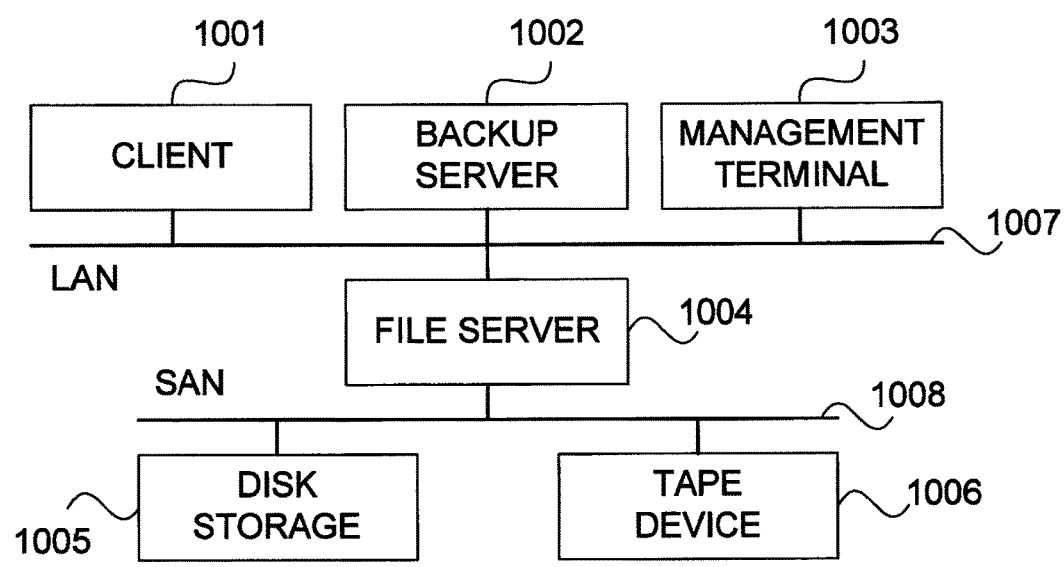
FIG. 1 is a diagram illustrating a configuration example of a file sharing system according to a first embodiment of this invention.

First, embodiments of this invention are outlined.

In a representative embodiment of this invention, a group of files (group of deduplicated files), which have been deduplicated on a file level, share one data body by referring to a file storing a shared data body (shared data storing file). In the embodiment, first, all shared data storing files are backed up from a file system, to which a file-level deduplication function has been applied, to a tape device. After that, the group of deduplicated files and regular files are backed up to the tape device. At this time, reference data pointing to the shared data storing file is written in header data of the deduplicated files.

In restoration, the shared data storing files are restored, and then the deduplicated files and the regular files are restored. In restoring the deduplicated files, a path of the shared data storing file is acquired from the header data of the deduplicated files, and reference to the shared data storing file is set to the restored deduplicated files based on the path.

Through the above-mentioned process, the files may be backed up to the tape device in a deduplicated state, to thereby suppress seek operations of the tape device in the restoration.

A system according to this invention includes a file server for providing a file sharing service to end users, disk storage in which the file server stores file data, the tape device in which the file server backs up the file data, a backup server for issuing a backup instruction to the file server, and a management terminal for managing the system. The system is coupled to a client used by the end users.

When receiving a backup request from a backup server program of the backup server, a backup program of the file server reads data of files from a file system volume stored in the disk storage. Then, the backup program transmits the data of the read files to the tape device. The tape device writes the received data to a tape. At this time, the backup program first transmits the shared data storing files to the tape device for backing up file systems to the tape. After completion of the backup of the shared data storing files, the backup program transmits data of the deduplicated files and the regular files to the tape device for backup to the tape.

On the other hand, when receiving a restore request from the backup server program of the backup server, the backup program of the file server reads data from the tape of the tape device, and writes the files read from the tape to the file system stored in the disk storage. At this time, the files of the group of shared data storing files, which were backed up first in the backup, are first restored, and then the deduplicated files and the regular files are restored.

Next, the embodiments of this invention are described by means of a file system in which data is managed on a file basis. However, this invention is not limited to the file system in which the data is managed on a file basis, and may also be applied to a system in which data is managed in a unit (for example, block or sector).

The following embodiments are merely examples, and this invention is not limited to those disclosed in the specification.

First Embodiment

FIG. 1 is a diagram illustrating a configuration example of a file sharing system according to a first embodiment of this invention.

The file sharing system of the first embodiment includes a backup server 1002, a management terminal 1003, a file server 1004, disk storage 1005, and a tape device 1006, and is coupled to a client 1001 via a network 1007.

Figure 2A:
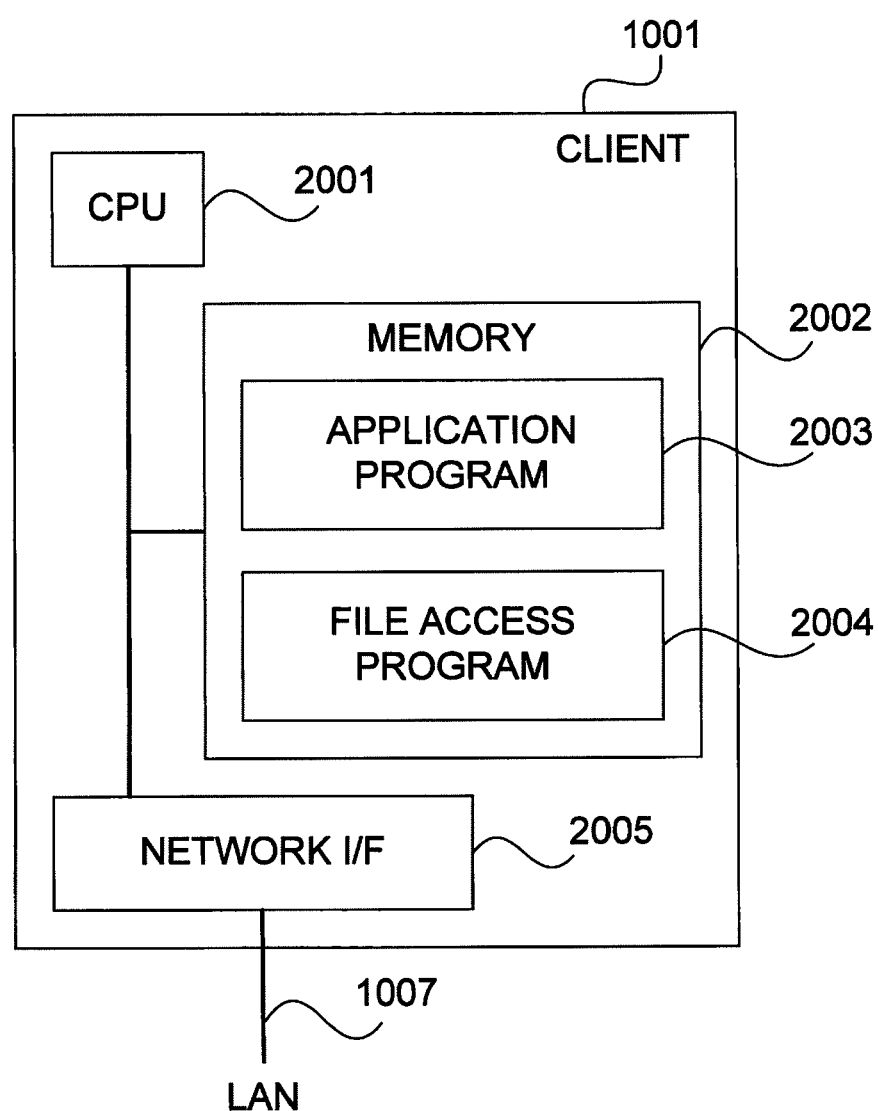
FIG. 2A is a block diagram illustrating a configuration example of a client according to the first embodiment of this invention.
Figure 2B:
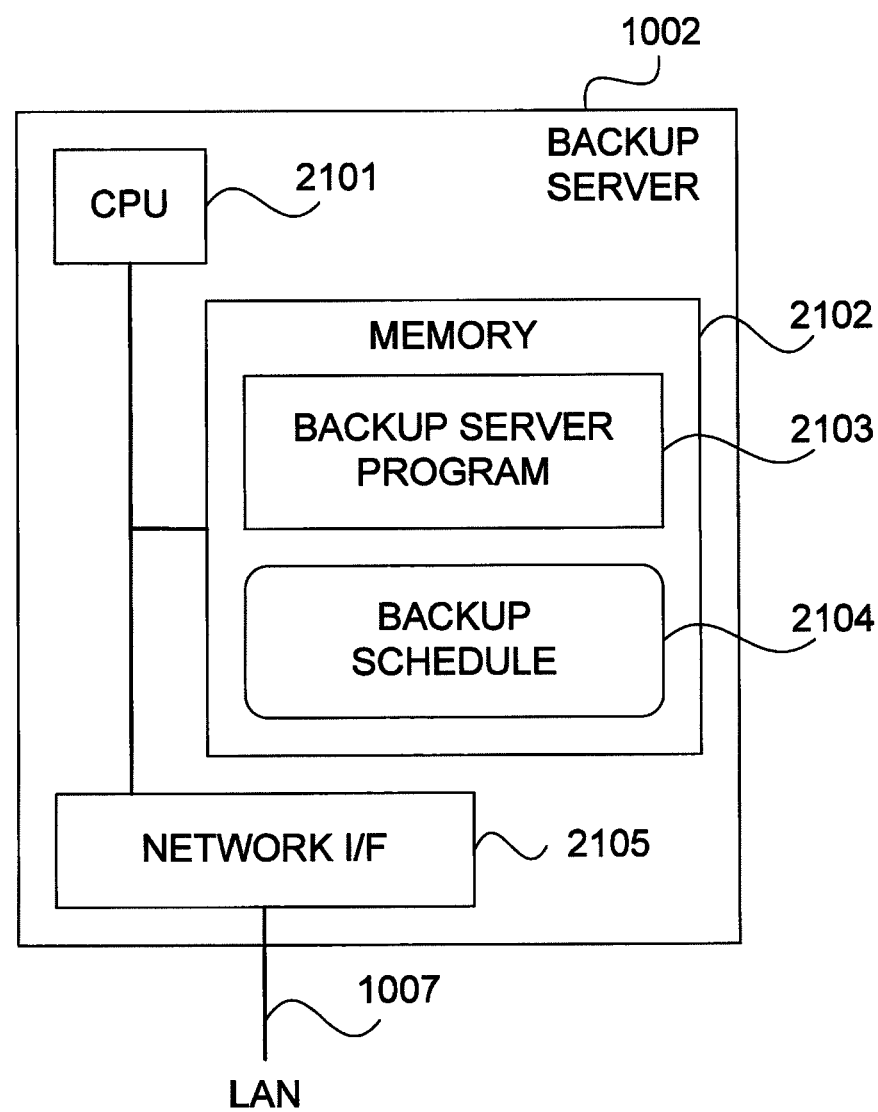
FIG. 2B is a block diagram illustrating a configuration example of a backup server according to the first embodiment of this invention.

The client 1001 is a computer used by the end users to whom the file sharing system is provided, and a configuration and a process thereof are described later (FIG. 2A). The backup server 1002 is a computer for transmitting the backup request and the restore request to the file server 1004, and a configuration and a process thereof are described later (FIG. 2B).

Figure 3A:
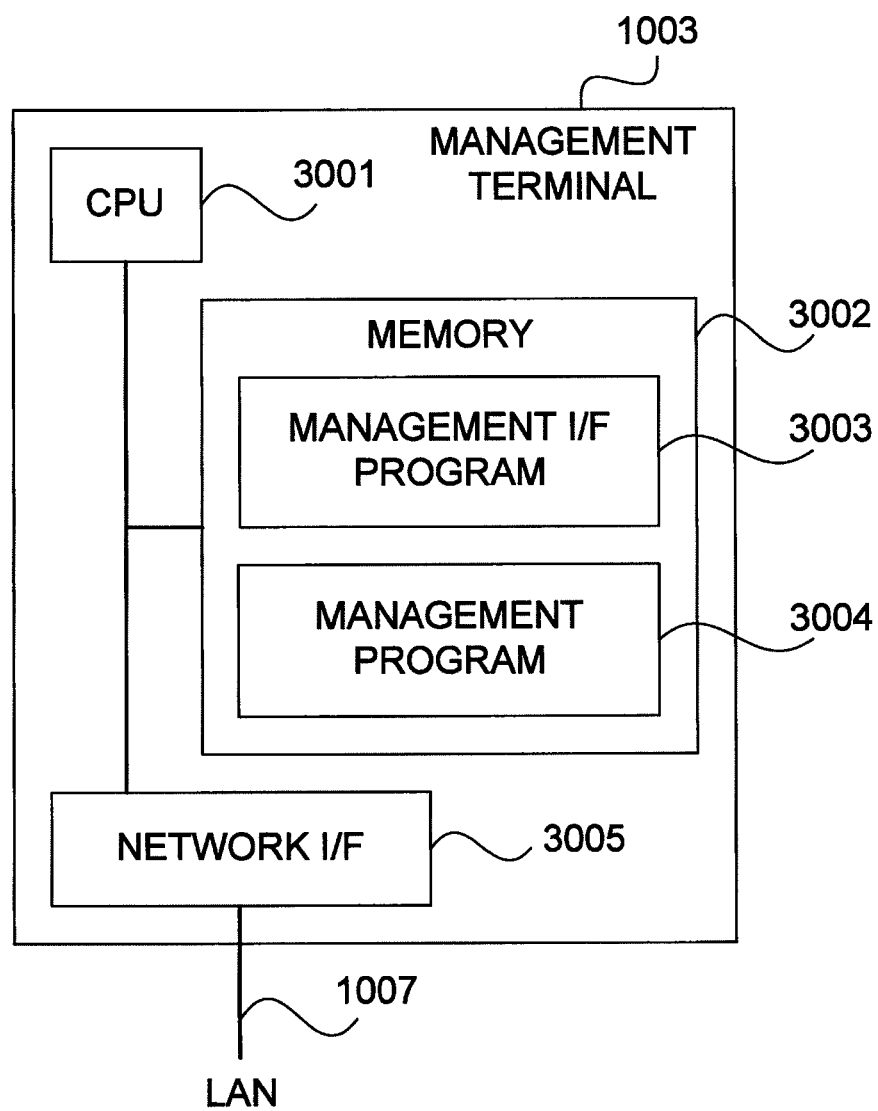
FIG. 3A is a block diagram illustrating a configuration example of a management terminal according to the first embodiment of this invention.
Figure 3B:
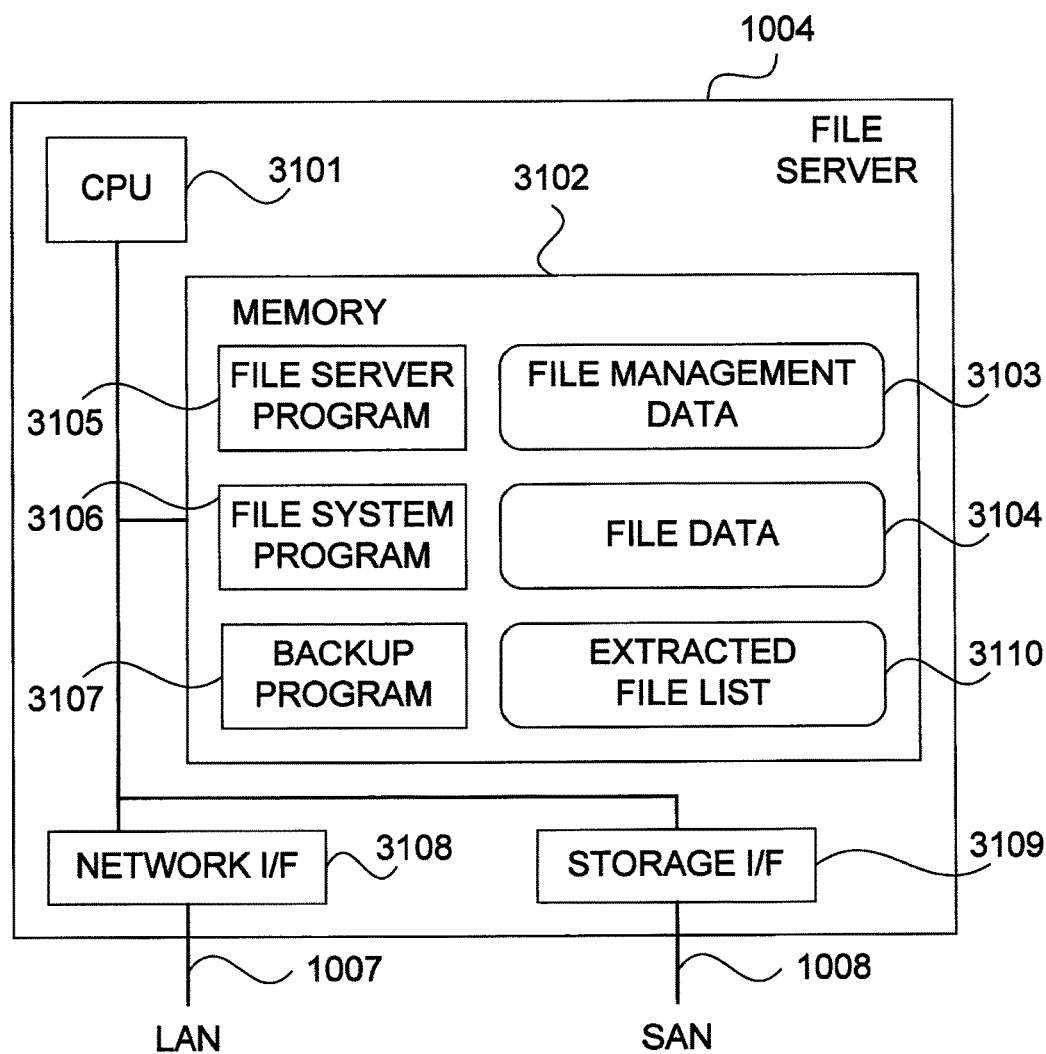
FIG. 3B is a block diagram illustrating a configuration example of a file server according to the first embodiment of this invention.

The management terminal 1003 is a computer for managing the file sharing system in this embodiment, and also manages a backup time and a restore time. A configuration and a process of the management terminal 1003 are described later (FIG. 3A). The file server 1004 is a computer for providing the file sharing service to the client 1001, and a configuration and a process thereof are described later (FIG. 3B).

The client 1001, the backup server 1002, the management terminal 1003, and the file server 1004 are coupled to one another via the network 1007. The network 1007 is, for example, a local area network and may be constituted of an Ethernet (trademark, the same applies in the following) and a wireless communication line. In this embodiment, the coupling among the client 1001, the backup server 1002, the management terminal 1003, and the file server 1004 is not limited to that described as an example.

Figure 4A:
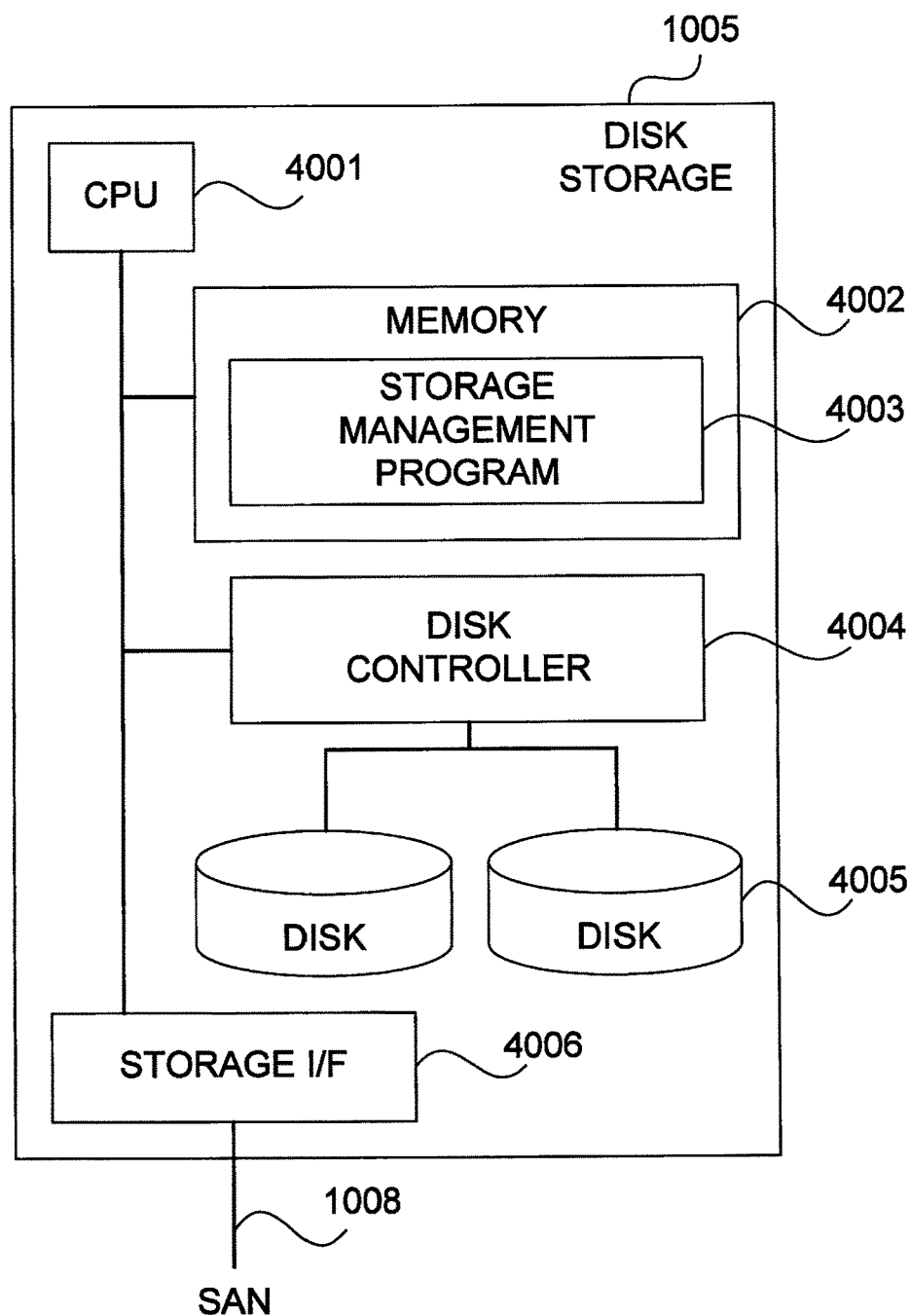
FIG. 4A is a block diagram illustrating a configuration example of a disk storage according to the first embodiment of this invention.
Figure 4B:
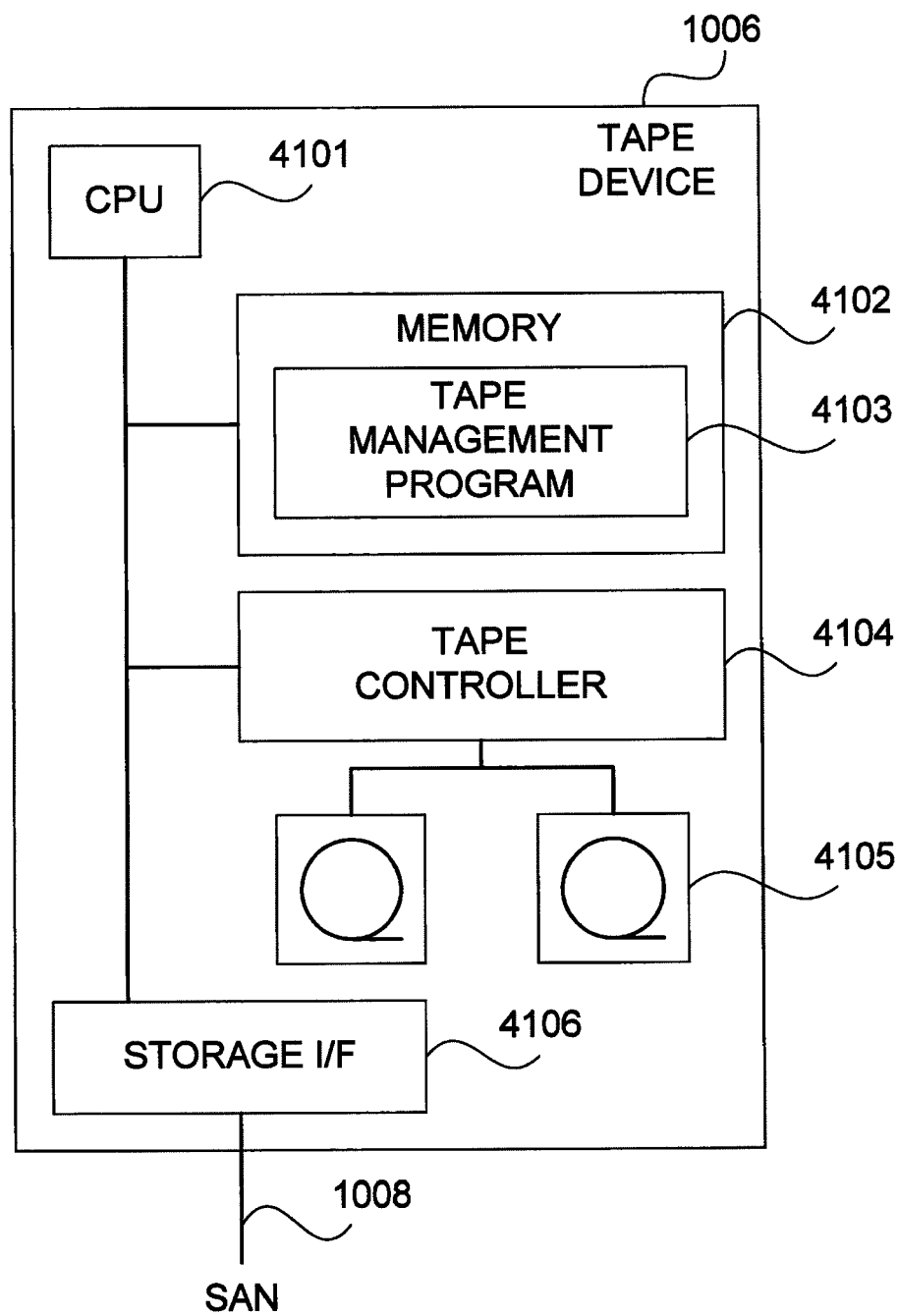
FIG. 4B is a block diagram illustrating a configuration example of a tape device according to the first embodiment of this invention.

The disk storage 1005 is a storage system for storing file data managed by the file server 1004, and a configuration and a process thereof are described later (FIG. 4A). The tape device 1006 is a device for writing and reading the file data managed by the file server 1004 to and from a tape, and a configuration and a process thereof are described later (FIG. 4B).

The file server 1004, the disk storage 1005, and the tape device 1006 are coupled to one another via a network 1008. The network 1008 is, for example, a storage area network using the Fibre Channel protocol. It should be noted that the network 1008 may be a network using another protocol such as iSCSI. The network 1007 and the network 1008 may be different networks or one network. In this embodiment, the coupling among the file server 1004, the disk storage 1005, and the tape device 1006 is not limited to those described as an example.

Further, in this embodiment, the file server 1004 executes a backup process (FIGS. 9, 14, and 15) and a restore process (FIG. 10), which are described later, but a device other than the file server 1004 (for example, backup server 1002) may execute those processes.

FIG. 2A is a block diagram illustrating a configuration example of the client 1001 according to this embodiment.

The client 1001 includes a processor (CPU) 2001, a memory 2002, and a network interface (I/F) 2005, and these devices are connected to one another via an internal communication path.

The processor 2001 executes an application program 2003 and a file access program 2004, which are stored in the memory 2002.

The application program 2003 is a program used by the end user who operates the client 1001, for example, a spreadsheet program. The file access program 2004 is a program for using the file sharing service provided by the file server 1004.

To use a file managed by the file server 1004, the application program 2003 makes a file access request to the file access program 2004. When receiving the file access request, the file access program 2004 transmits the file access request to a file server program 3105 of the file server 1004 via the network I/F 2005 by using a protocol (for example, Common Internet File System (CIFS) protocol) to use the file sharing service. Then, the file access program 2004 receives a result of the file access from the file server program 3105 of the file server 1004, and returns the result to the application program 2003.

FIG. 2B is a block diagram illustrating a configuration example of the backup server 1002 according to this embodiment.

The backup server 1002 includes a processor (CPU) 2101, a memory 2102, and a network I/F 2105, and these devices are connected to one another via an internal communication path.

The processor 2101 executes a backup server program 2103 stored in the memory 2102.

The backup server program 2103 is a program for transmitting the backup request and the restore request to a backup program 3107 of the file server 1004 via the network I/F 2105. The backup server 1002 may use a protocol such as the Network Data Management Protocol (NDMP) to transmit the backup request and the restore request, but the method of transferring the requests is not limited to that described as an example.

Further, the backup server program 2103 may create backups regularly based on a backup schedule 2104. The backup schedule 2104 stores a backup acquisition interval, a backup acquisition date/time, and the like. The backup schedule 2104 is set by an administrator of the file sharing system of this embodiment by using an editor and/or a graphical user interface (GUI). It should be noted that the method of setting the backup schedule 2104 is not limited to that described as an example.

FIG. 3A is a block diagram illustrating a configuration example of the management terminal 1003 according to this embodiment.

The management terminal 1003 includes a processor (CPU) 3001, a memory 3002, and a network I/F 3005, and these devices are connected to one another via an internal communication path.

The processor 3001 executes a management I/F program 3003 and a management program 3004, which are stored in the memory 3002.

The management I/F program 3003 is a program for providing a management screen to the administrator who manages the file sharing system of this embodiment, and transmits configuration data, which is input by the administrator, to the management program 3004.

The management program 3004 is a program for setting the configuration data, which is inputted by the administrator, to the file server 1004 and the backup server 1002. For example, the management program 3004 sets backup interval data, which is input by the administrator, to the backup schedule 2104 of the backup server 1002. The configuration data may be transferred by using a protocol such as the SSH File Transfer Protocol (SFTP), but the method of transferring the configuration data is not limited to that described as an example.

FIG. 3B is a block diagram illustrating a configuration example of the file server 1004 according to this embodiment.

The file server 1004 includes a processor (CPU) 3101, a memory 3102, a network I/F 3108, and a storage I/F 3109, and these devices are connected to one another via an internal communication path.

The processor 3101 executes the file server program 3105, a file system program 3106, and the backup program 3107, which are stored in the memory 3102.

The file server program 3105 is a program for providing the file sharing service to the client 1001. When receiving a file access request from the file access program 2004 of the client 1001, the file server program 3105 makes a file access request to the file system program 3106. Then, the file server program 3105 receives a file access result from the file system program 3106, and returns the received result to the file access program 2004 of the client 1001. The file server program 3105 may be, for example, an NFS daemon, but is not limited to that described as an example.

The file system program 3106 is a program for accessing data stored in the disk storage 1005. When receiving the file access request from the file server program 3105 via the network I/F 3108, the file system program 3106 accesses data stored in disks 4005 of the disk storage 1005 via the storage I/F 3109. Then, the file system program 3106 returns the access result to the file server program 3105.

The file server 1004 stores file management data 3103 for accessing files, file data 3104, and an extracted file list 3110 in the memory 3102.

The file management data 3103 is management data including data on an administrator of the file, a block address of the file data stored in the disks 4005, and the like. The file management data 3103 is created by the file system program 3106. It should be noted that the file management data 3103 is stored also in the disks 4005 of the disk storage 1005. When rebooted, the file server 1004 may read and use the file management data 3103 stored in the disks 4005.

The file data 3104 is data obtained by reading the file data stored in the disks 4005 and writing the read data in the memory 3102. The file data 3104 is created by the file system program 3106. It should be noted that the file data 3104 is stored in the disks 4005 of the disk storage 1005. When rebooted, the file server 1004 may read and use the file data 3104 stored in the disks 4005.

The backup program 3107 is a program for copying, based on a request from the backup server 1002, a group of files stored in the disks 4005.

Figure 9:
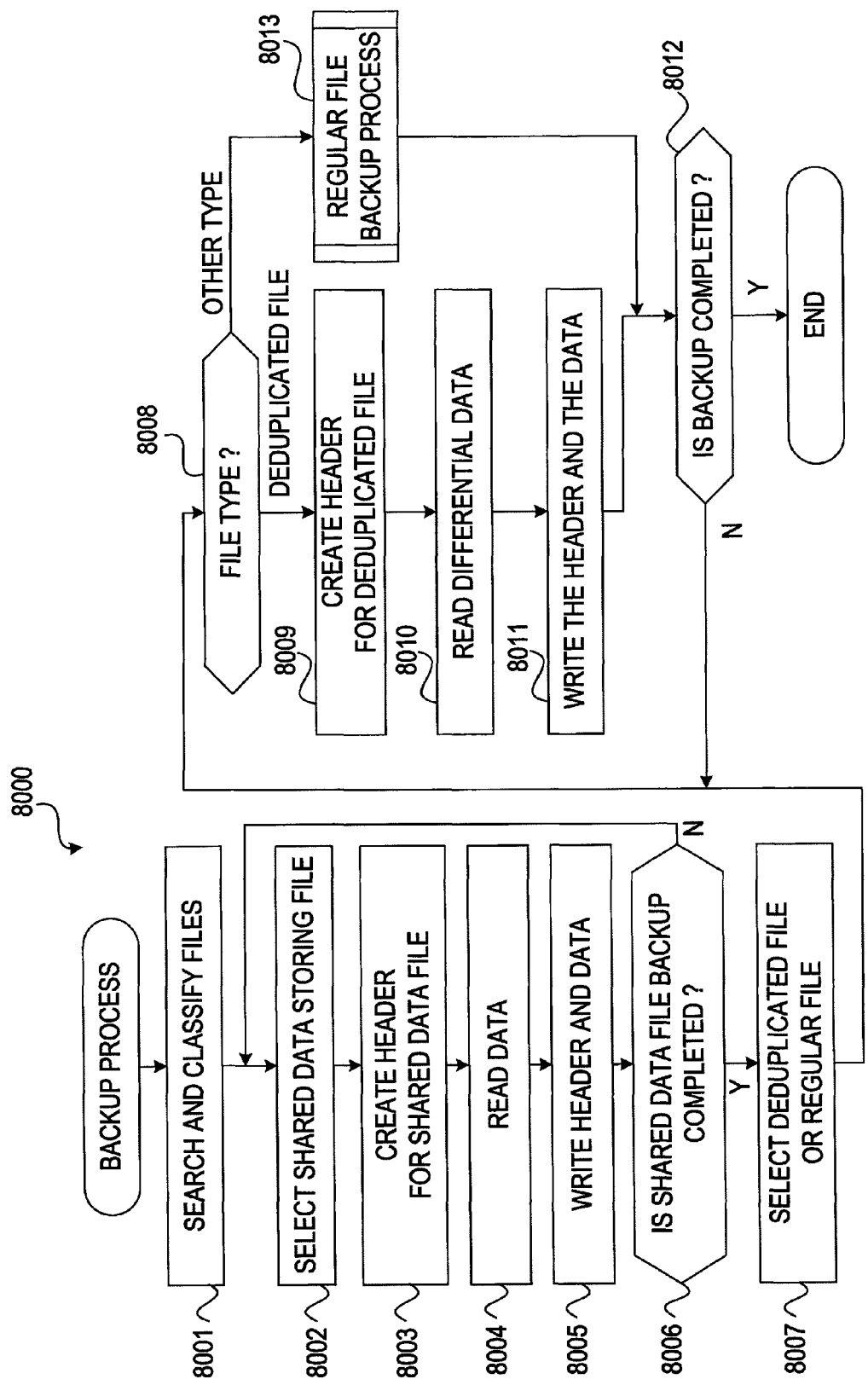
FIG. 9 is a flow chart of a backup process according to the first embodiment of this invention.

When receiving a backup request from the backup server program 2103 of the backup server 1002 via the network I/F 3108, the backup program 3107 reads the group of files from the disks 4005 via the storage I/F 3109, and writes the read data in tapes 4105 of the tape device 1006. Details of the backup process are described later (FIG. 9).

Figure 10:
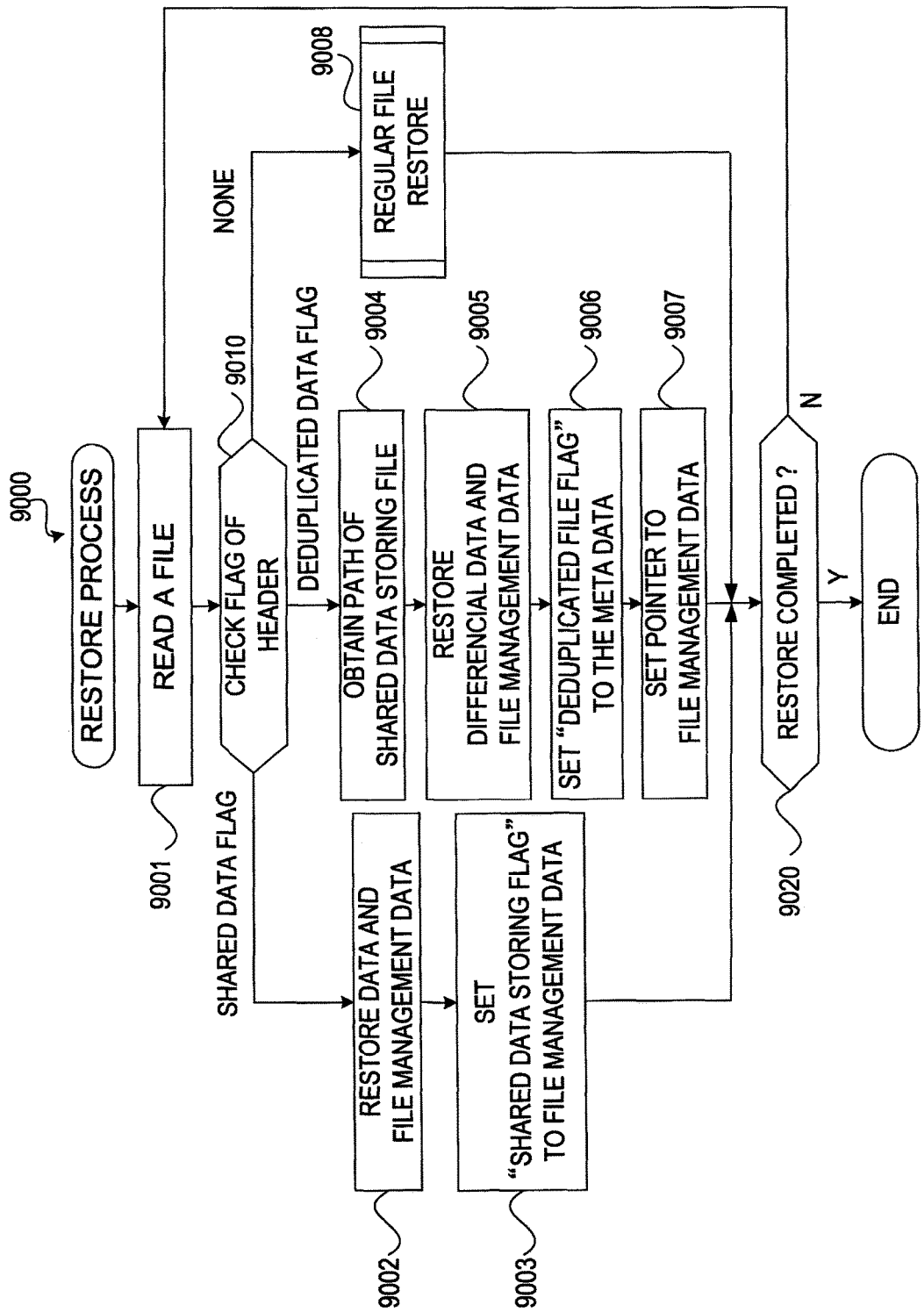
FIG. 10 is a flow chart of a restore process according to the first embodiment of this invention.

Further, when receiving a restore request from the backup server program 2103 of the backup server 1002 via the network I/F 3108, the backup program 3107 reads data from the tapes 4105 of the tape device 1006 via the storage I/F 3109, and writes the read data in the disks 4005. In this manner, the backup program 3107 restores files. Details of the restore process are described later (FIG. 10).

The extracted file list 3110 is data used by the backup program 3107. The extracted file list 3110 includes a list of shared data storing files 5002 to be described later. The extracted file list 3110 is created when the backup program 3107 backs up the group of files. In this embodiment, how to use the extracted file list 3110 is described later.

In this embodiment, in backing up files, to which file-level deduplication has been applied, to the tape device 1006, the backup program 3107 backs up the shared data storing files 5002 to be described later and then deduplicated files 5001A and 5001B. Further, the backup program 3107 sets data for use in restoration in headers of the files backed up to the tape device 1006.

Further, in restoring the files to the disk storage 1005, the backup program 3107 restores the shared data storing files 5002 and then the deduplicated files 5001A and 5001B. In restoring the deduplicated files 5001A and 5001B, the backup program 3107 sets reference data 5006 to the shared data storing files 5002.

In this manner, by first backing up the shared data storing files 5002 to the tape device 1006 before backing up the deduplicated file 5001A and the like, the backup program 3107 may set the reference to the shared data storing files 5002, which are needed in restoring the deduplicated files 5001A and 5001B.

In addition, by restoring the shared data storing files 5002 to the disk storage 1005 before restoring the deduplicated file 5001A, the backup program 3107 may set the reference from the deduplicated files 5001A and 5001B to the shared data storing files 5002.

FIG. 4A is a block diagram illustrating a configuration example of the disk storage 1005 according to this embodiment.

The disk storage 1005 includes a processor (CPU) 4001, a memory 4002, a disk controller 4004, and a storage I/F 4006, and these devices are connected to one another via an internal communication path.

The disk controller 4004 is connected to the disks 4005 to control the disks 4005. The disk controller 4004 has the redundant arrays of inexpensive disks (RAID) function and provides redundancy to the plurality of disks 4005, to thereby improve fault tolerance of the disk storage 1005.

The processor 4001 executes a storage management program 4003 stored in the memory 4002. The storage management program 4003 is a program for managing the RAID function of the disk controller 4004 and configures for the redundant array, and control data input and output with respect to the disks 4005.

Each of the disks 4005 is a magnetic disk drive or a solid state drive, but is not limited to those described as an example.

In this embodiment, the disk storage 1005 may be a storage device that does not have the redundancy function, and the configuration of the disk storage 1005 is not limited to that described as an example.

FIG. 4B is a block diagram illustrating a configuration example of the tape device 1006 according to this embodiment.

The tape device 1006 includes a processor (CPU) 4101, a memory 4102, a tape controller 4104, and a storage I/F 4106, and these devices are connected to one another via an internal communication path.

The tape controller 4104 controls data input and output with respect to the tapes 4105 attached to the tape device 1006 and the seek operation of the tapes 4105. The processor 4101 executes a tape management program 4103 stored in the memory 4102. The tape management program 4103 is a program for loading the tape 4105 that is necessary for backup and restoration to a tape head.

In this embodiment, the storage system for backing up the file data is not limited to the tape device 1006 described as an example, and may be a storage device such as an optical disc device.

It should be noted that in this embodiment, a description is given of processes of backing up data stored in the disk storage 1005 to the tape device 1006 and restoring the data backed up in the tape device 1006 to the disk storage 1005. However, this invention is not limited to the above-mentioned configuration, and the disk storage 1005 may be any storage system having high random access performance (short access time) for providing the file data to the file server 1004, and the same effect can be obtained as long as the tape device 1006 is a storage system having high sequential access performance for backing up the data stored in the disk storage 1005 (suitable for accessing the stored data in the written order and having a long seek operation time for random access).

Figure 5:
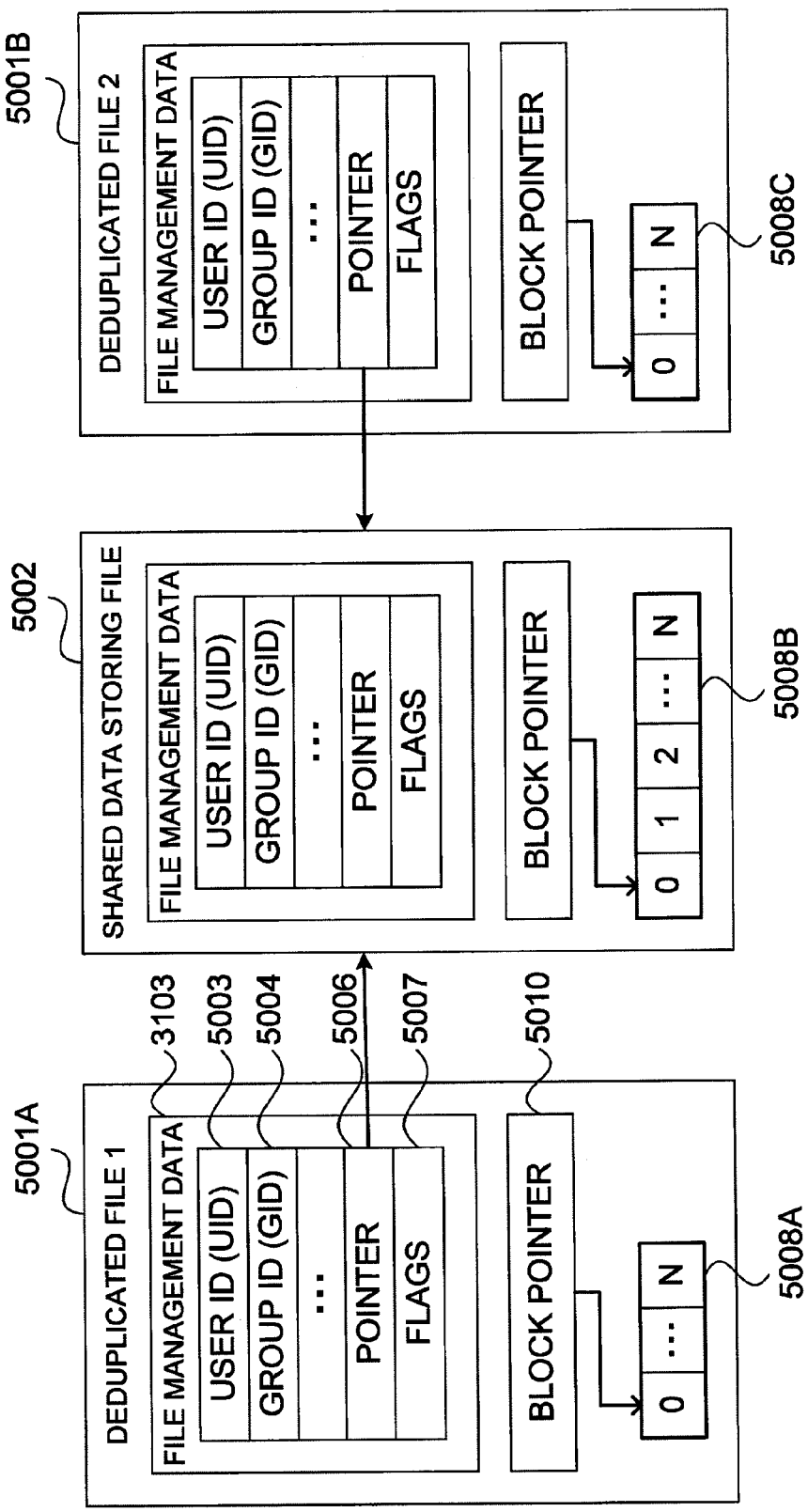
FIG. 5 is a diagram illustrating a configuration example of a group of deduplicated files stored in the disk storage according to the first embodiment of this invention.

FIG. 5 is a diagram illustrating a configuration example of the group of deduplicated files stored in the disk storage 1005 according to this embodiment.

The group of deduplicated files includes the deduplicated file 5001A, the deduplicated file 5001B, and the shared data storing file 5002. Each of the deduplicated files 5001A and 5001B and the shared data storing file 5002 includes the file management data 3103 described above, a block pointer 5010, and a data block 5008B or the like. The file management data 3103 includes management data such as a user ID (UID) 5003 and a group ID (GID) 5004, and a pointer 5006 and flags 5007, which are necessary for deduplication.

As illustrated in FIG. 5, the pointer 5006 is used by the deduplicated files 5001 to refer to the shared data storing file 5002. The pointers 5006 may be inode numbers, file paths, or the like. It should be noted that the pointer 5006 may be any data that enables reference to the shared data storing file 5002, and is not limited to those described as an example.

The flags 5007 are used to distinguish the deduplicated files 5001, the shared data storing file 5002, and other files. For example, the flags 5007 may be defined so that the first bit indicates a deduplicated file and the second bit indicates a shared data storing file.

The block pointer 5010 is data indicating a storage position of the file data on the disks 4005. In the case where the deduplicated files 5001A and 5001B and the shared data storing file 5002 do not include actual data, the block pointer 5010 is not set.

In FIG. 5, the block pointer 5010 is set to each of the deduplicated files 5001A and 5001B. The deduplicated files 5001A and 5001B are updated after the deduplication process, and hence the block pointer 5010 points to differential data generated by the update. The differential data is stored in the disks 4005 (5008A and 5008C). In FIG. 5, the deduplicated files 5001A and 5001B store different differential data.

In FIG. 5, when the deduplication process is executed, two deduplicated files 5001A and 5001B have the same data. Therefore, the two files 5001A and 5001B refer to the same shared data storing file 5002. On the other hand, when another file has the same data of the two files, the file refers to the same shared data storing file 5002.

The deduplicated file 5001A and the deduplicated file 5001B store the same file data before the deduplication process. At the time of the deduplication process, the shared data storing file 5002 is created. To the shared data storing file 5002, the file data of the deduplicated file 5001A or 5001B is set. Then, the deduplicated files 5001A and 5001B refer to the shared data storing file 5002. When the file system program 3106 accesses the deduplicated file 5001A or 5001B, the file system program 3106 refers to a deduplicated data file flag included in the flags 5007, and the file system program 3106 determines whether the file to be accessed is a deduplicated file.

Figure 6:
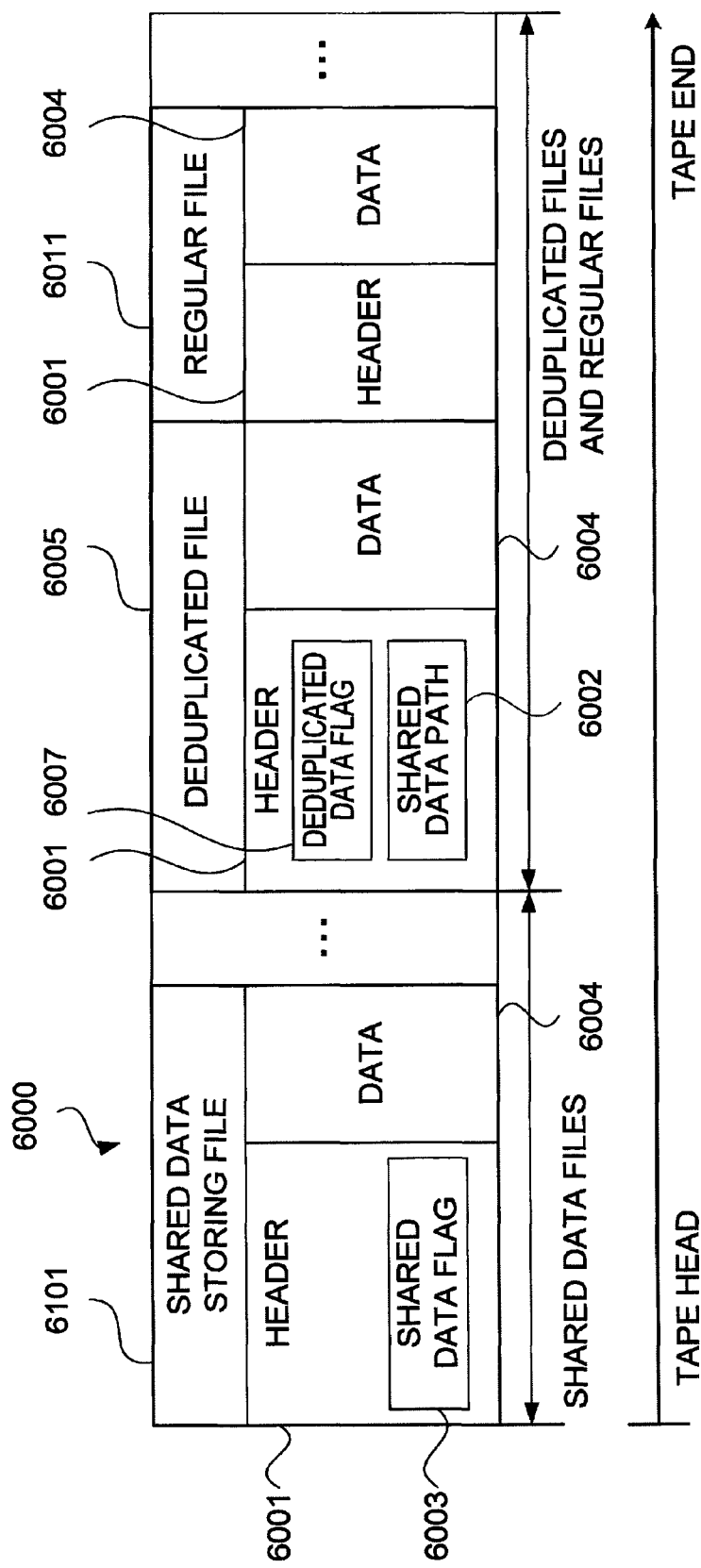
FIG. 6 is a diagram illustrating structure of data stored in a tape of the tape device according to the first embodiment of this invention.

FIG. 6 is a diagram illustrating structure of data stored in the tape 4105 of the tape device 1006 according to this embodiment.

The tape data 6000 stores data of each file is stored in file system volumes from the tape head sequentially. First, the shared data storing files 5002 are stored from the head of the tape data 6000. After all the shared data storing files 5002 are stored in the tape 4105, the deduplicated files 5001 and the regular files are stored. Therefore, from the head of the tape 4105, reading positions of the shared data storing files 5002 is before reading positions of the deduplicated files 5001. Therefore, in sequentially reading the data from the head of the tape 4105, the shared data storing files 5002 are read before the deduplicated files 5001.

A tape area 6101 storing the shared data storing file 5002 includes a header 6001 and data 6004. The header 6001 stores data on the file management data 3103. When a file stored in the tape data 6000 is a shared data storing file 5002, a shared data flag 6003 of the header 6001 is set, and the data of the shared data storing file 5002 is stored in the data 6004. When there are a plurality of shared data storing files, the plurality of shared data storing files 5002 are stored in the same data structure as the tape area 6101.

After the backup of the shared data storing file 5002 is completed, the deduplicated files 5001 and the regular files are written in the tape 4105. In this embodiment, a tape area 6005 for backing up the deduplicated files 5001 to the tape 4105 includes the header 6001 and the data 6004. The header 6001 stores data on the file management data 3103. In the case where a file stored in the tape data 6000 is a deduplicated file 5001, a deduplicated data flag 6007 of the header 6001 is set.

A shared data path 6002 stores reference data pointing to the shared data storing file 5002 to which the deduplicated file 5001 refers. The reference data may be a file path of the shared data storing file 5002. It should be noted that the reference data may also be data for uniquely identifying the shared data storing file 5002, for example, an inode number or a file path or a block address, and is not limited to those described as an example.

The data 6004 in the tape area 6005 stores the differential data 5008A, C of the deduplicated files 5001A, B.

A tape area 6011 for the regular files according to this embodiment includes the header 6001 and the data 6004. The header 6001 stores data on the file management data 3103. The data 6004 stores data of the file.

In the structure of the tape data according to this invention, the order in which the deduplicated files 5001 and the regular files are stored is not limited to the illustrated order. In FIG. 6, the regular files are stored after the deduplicated files 5001, but the order may be reversed or random.

Figure 7:
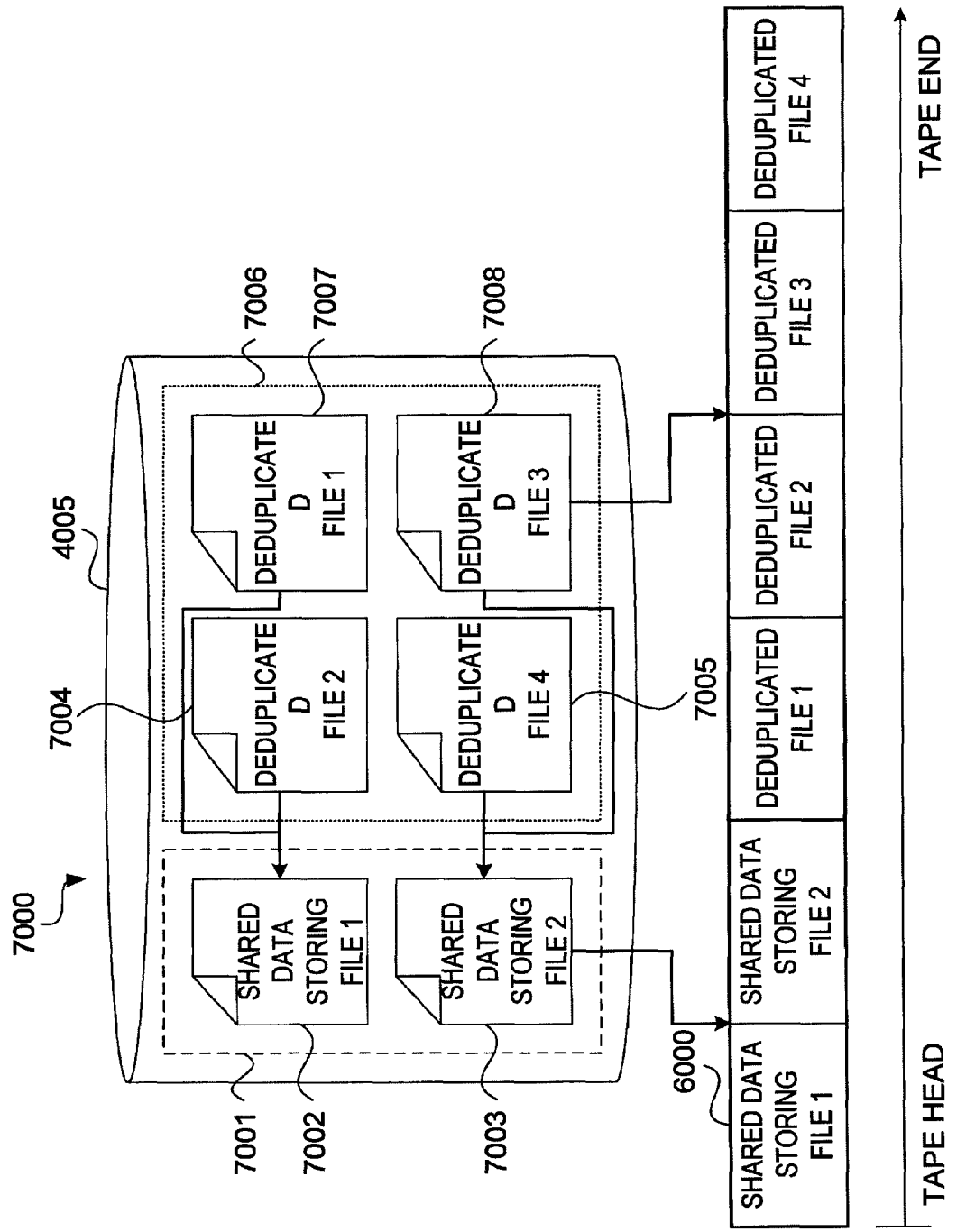
FIG. 7 is a diagram schematically illustrating creation of backup data stored in the tape according to the first embodiment of this invention.

FIG. 7 is a diagram schematically illustrating creation of backup data stored in the tape 4105 according to this embodiment.

The disk 4005 stores four deduplicated files 5001 and two shared data storing files 5002. A deduplicated file 1 (7007) and a deduplicated file 2 (7004) refer to a shared data storing file 1 (7002), and a deduplicated file 3 (7008) and a deduplicated file 4 (7005) refer to a shared data storing file 2 (7003).

In the backup method according to this embodiment, a shared data storing file group 7001 is first written in the tape 4105. The shared data storing file group 7001 is stored in the structure of the tape data 6000 described above. In the example illustrated in FIG. 7, after the shared data storing file 1 (7002) is written from the head of the tape 4105, the shared data storing file 2 (7003) is written. In this example, two shared data storing files 5002 are stored in the disk 4005, and hence the backup is completed when the two shared data storing files 5002 are written. Thereafter, groups 7006 of the deduplicated files 5001 are written in the tape 4105. In the example illustrated in FIG. 7, the deduplicated file 1 (7007), the deduplicated file 2 (7004), the deduplicated file 3 (7008), and the deduplicated file 4 (7005) are written in the stated order. It should be noted that as described above, the order in which the deduplicated files are written is not limited to the illustrated order.

In this manner, after the shared data storing file group 7001 is written in the tape 4105, the deduplicated file group 7006 is written in the tape 4105.

Figure 8:
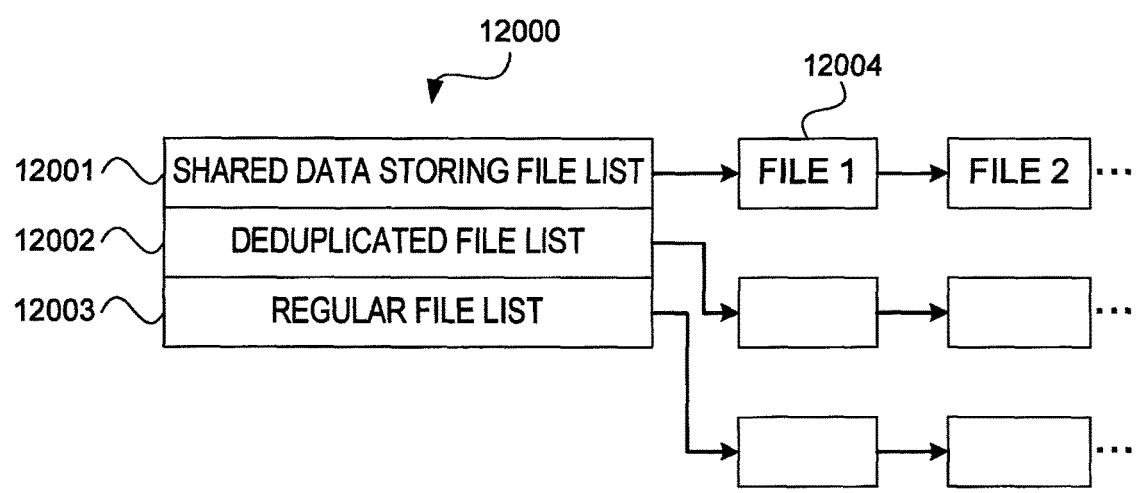
FIG. 8 is a diagram illustrating a configuration of an extracted file list according to the first embodiment of this invention.

FIG. 8 is a diagram illustrating a configuration of the extracted file list 3110 according to this embodiment.

The extracted file list 3110 is created when the backup program 3107 is executed. Alternatively, the extracted file list 3110 may be created in advance and updated as needed in the deduplication or in creating a file.

The extracted file list 3110 includes a list 12001 of the shared data storing files 5002, a list 12002 of the deduplicated files 5001, and a regular file list 12003.

The shared data storing file list 12001 includes, from its head, a list element indicating a file path 12004 of each shared data storing file. The other lists also include, from their heads, the list element indicating the file path 12004.

It should be noted that in this embodiment, it suffices when the shared data storing files and the other files are distinguished, and hence the list 12002 of the deduplicated files 5001 and the regular file list may be one list. Alternatively, the extracted file list 3110 may include only the shared data storing file list 12001.

FIG. 9 is a flow chart of the backup process according to this embodiment. When the processor 3101 of the file server 1004 executes the backup program 3107, the backup process illustrated in FIG. 9 is performed.

When receiving a backup request from the backup server program 2103 of the backup server 1002, the backup program 3107 searches the disks 4005 and classifies the shared data storing files 5002, the deduplicated files 5001, and the regular files (Step 8001). Specifically, the backup program 3107 refers to the flags 5007 of the file management data 3103 to identify the type of each file. Then, the backup program 3107 stores a result of classifying the files in the extracted file list 3110.

Thereafter, the backup program 3107 selects one file from the shared data storing file list 12001 of the extracted file list 3110 (Step 8002).

Then, the backup program 3107 uses the file management data 3103 of the file selected in Step 8002 to create the header 6001 of the tape data structure 6000 (Step 8003). Specifically, the backup program 3107 sets the shared data flag 6003 of the header 6001.

Then, the backup program 3107 reads data 5008B of the shared data storing file 5002 (Step 8004), and writes the header 6001 and the read data in the tape 4105 (Step 8005).

Then, the backup program 3107 determines whether all the shared data storing files 5002 are backed up (Step 8006). In the case where it is found as the result of the determination that some of the shared data storing files 5002 are not written the tape 4105 ("N" in Step 8006), the backup program 3107 returns to Step 8002 to continue the process. On the other hand, In the case where all the shared data storing files 5002 are written in the tape 4105 ("Y" in Step 8006), the backup program 3107 proceeds to Step 8007 and writes the deduplicated files 5001 and the regular files in the tape.

The backup program 3107 selects one file from the deduplicated file list 12002 or the regular file list 12003 of the extracted file list 3110 (Step 8007).

Then, the backup program 3107 determines the file type of the selected file (Step 8008). In the case where it is found as the result of the determination that the selected file is a regular file, the backup program 3107 writes the file in the tape by the conventional backup process, that is, a method similar to the conventional method (Step 8013).

On the other hand, in the case where the selected file is a deduplicated file 5001, the backup program 3107 executes Steps 8009 to 8011. First, the backup program 3107 uses the file management data 3103 of the deduplicated file 5001 to create the header 6001 (Step 8009). Specifically, the backup program 3107 sets the deduplicated data flag 6007 of the header 6001. Further, the backup program 3107 uses the pointer 5006 of the file management data 3103 to obtain the file path of the shared data storing file 5002, and sets the file path of the shared data storing file 5002 to a shared data path 6002 of the header 6001. Next, the backup program 3107 reads the differential data 5008A and 5008B of the deduplicated files 5001 (Step 8010). Then, the backup program 3107 writes the created header and the differential data in the tape 4105 (Step 8011).

Thereafter, the backup program 3107 determines whether all the deduplicated files 5001 and regular files are backed up (Step 8012). In the case where it is found as the result of the determination that some of the deduplicated files 5001 or regular files are not written in the tape 4105 ("N" in Step 8012), the backup program 3107 returns to Step 8007 to continue the process for the next file. On the other hand, in the case where all the deduplicated files 5001 and regular files are written in the tape 4105 ("Y" in Step 8012), the backup program 3107 ends the backup process.

With the operation of the backup program 3107 described above, after the shared data storing files 5002 are written at the beginning of the tape 4105, the deduplicated files 5001 and the regular files are written. In other words, in the backup process illustrated in FIG. 9, when viewed from the head of the tape 4105, the reading positions of the shared data storing files 5002 come before the reading positions of the deduplicated files 5001. Therefore, in sequentially reading the data from the head of the tape 4105, the shared data storing files 5002 are read before the deduplicated files 5001.

Next, a process of restoring the files backed up to the tape 4105 is described. It is assumed for restore process that the files backed up restored sequentially (sequentially read) from the head of the tape. The sequential reading can maximize the reading performance of the tape. For example, when a file written in the middle of the tape is to be restored, a cueing process (seek process) of the file is required. Compared to a hard disk drive or a solid state drive, the time needed for the seek process of the tape is very long. Therefore, when the seek process is performed, the reading performance of the tape declines significantly and the restore time is elongated.

It should be noted that storage media having characteristics suitable for the sequential reading include, in addition to the tape, a CD-ROM, a DVD-ROM, and a floppy disk. The restore process of this invention is also effective for those storage media. In other words, this invention is effective for a storage medium having a large difference in performance between the sequential reading and the reading involving the cueing (random reading).

FIG. 10 is a flow chart of the restore process according to this embodiment. When the processor 3101 of the file server 1004 executes the backup program 3107, the restore process illustrated in FIG. 10 is performed.

When receiving a restore request from the backup server program 2103 of the backup server 1002, the backup program 3107 loads a tape 4105 attached on the tape device 1006, reads files one by one from the head of the tape 4105 toward the end thereof (Step 9001), and checks the flag of the header 6001 of the read file (Step 9010).

In the case where the shared data flag 6003 is set in the header 6001, the backup program 3107 writes the file management data 3103 and the data 6004 as a file in the disk 4005 (Step 9002). Then, the backup program 3107 sets the flag indicative of the shared data storing file 5002 to the flags 5007 of the file management data 3103 (Step 9003).

On the other hand, in the case where the deduplicated data flag 6007 is set in the header 6001, the backup program 3107 obtains the shared data path 6002 from the header 6001 (Step 9004). Then, the backup program 3107 reads the data 6004 from the tape 4105 and writes the data as a file in the disk 4005 (Step 9005). Then, the backup program 3107 sets the flag, which indicates the restored file as the deduplicated file 5001, to the flags 5007 of the file management data 3103 (Step 9006).

Then, the backup program 3107 sets the reference data to the pointer 5006 of the file management data 3103 (Step 9007). Specifically, the backup program 3107 uses the path of the shared data storing file 5001 obtained in Step 9004 to set the reference data.

On the other hand, in the case where it is determined in Step 9010 that no flag is set in the header 6001, the backup program 3107 restores the file as a regular file (Step 9008).

Thereafter, the backup program 3107 determines whether all the files written in the tape 4105 are restored (Step 9020). In the case where it is found as the result of the determination that some of the files are not restored ("N" in Step 9020), the backup program 3107 returns to Step 9001 to continue the process for the next file. On the other hand, in the case where the restoration of all the files is completed ("Y" in Step 9020), the backup program 3107 ends the process.

As described above, according to the first embodiment, in the backup process described above with reference to FIG. 9, the shared data storing files 5002 are stored in the tape 4105 so that the reading positions of the shared data storing files 5002 come before the reading positions of the deduplicated files 5001. Therefore, in the process of restoring the backup data by the sequential reading illustrated in FIG. 10, Steps 9002 and 9003 are executed first so that after the shared data storing files 5002 are restored, the deduplicated files 5001 are restored. In other words, the shared data storing files 5002 exist at the time when the deduplicated files 5001 are restored, and hence the pointer 5006 can be set in Step 9007. It should be noted that when the restoration is performed without taking the order of the shared data storing files 5002 and the deduplicated files 5001 into consideration, the shared data storing files 5002 do not exist at the time when the deduplicated files 5001 are restored, and hence the pointer 5006 cannot be set in Step 9007.

Therefore, according to the first embodiment, in the file system to which the file-level deduplication has been applied, the backup and the restoration may be performed while maintaining the deduplicated state. Therefore, the seek operations of the tape device in the restoration may be suppressed.

Second Embodiment

In a second embodiment of this invention, in backing up the files of the deduplicated file system to the tape 4105, the shared data storing files 5002 are not backed up first in a collective manner, as opposed to the first embodiment. Therefore, in the second embodiment, in backing up the deduplicated files 5001, when the shared data storing file 5002 associated thereto has not been backed up, the shared data storing file 5002 is backed up first.

It should be noted that in the second embodiment, the same components as those in the first embodiment described above are denoted by the same reference symbols, and descriptions thereof are omitted.

Figure 11:
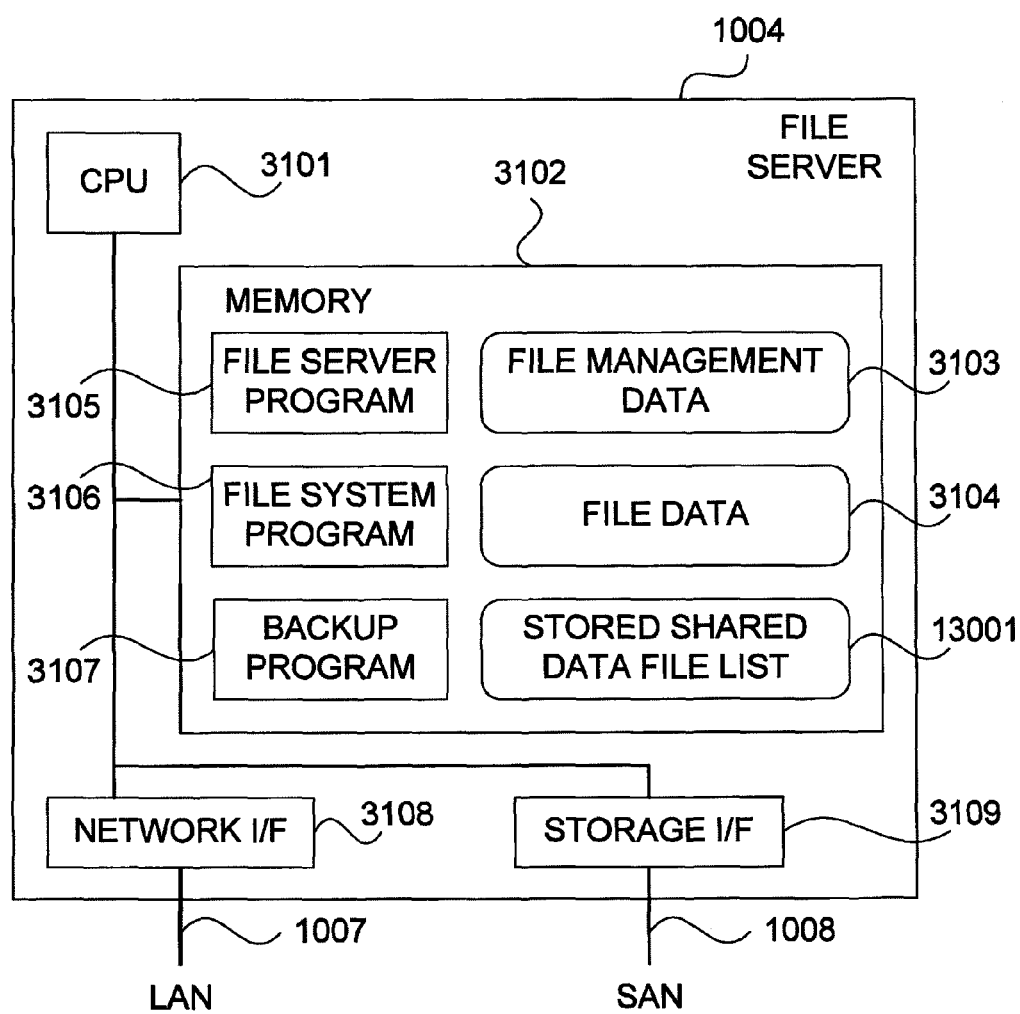
FIG. 11 is a block diagram illustrating a configuration example of a file server according to a second embodiment of this invention.

FIG. 11 is a block diagram illustrating a configuration example of the file server 1004 according to the second embodiment.

The file server 1004 in the second embodiment stores, instead of the extracted file list 3110 in the first embodiment, a stored shared data file list 13001 in the memory 3102.

The stored shared data file list 13001 is a list of the shared data storing files 5002 that have already been backed up to the tape 4105, and includes the reference data (inodes, file paths, or the like) of the files. The stored shared data file list 13001 is created when the backup program 3107 backs up the files.

Figure 12:
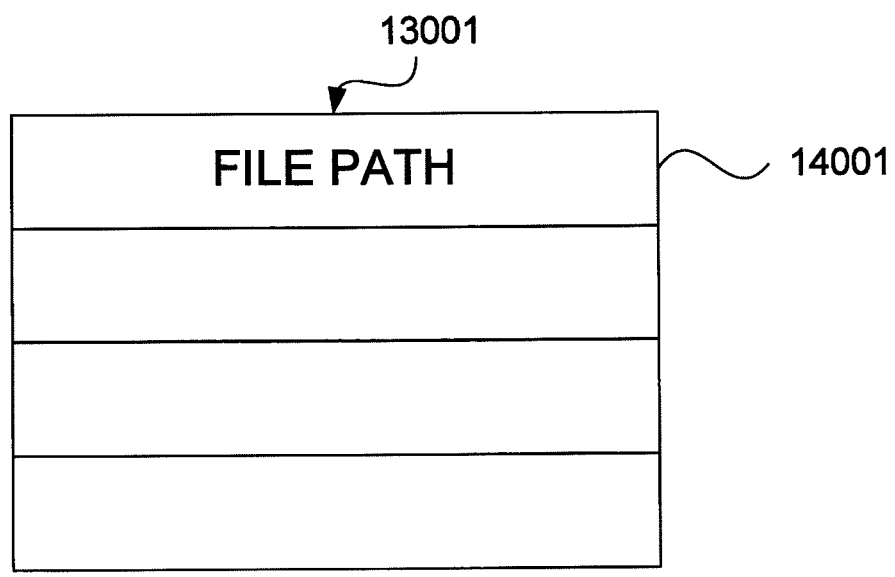
FIG. 12 is a diagram illustrating a configuration of a stored shared data file list according to the second embodiment of this invention.

FIG. 12 is a diagram illustrating a configuration of the stored shared data file list 13001 according to the second embodiment.

The stored shared data file list 13001 includes file paths 14001 of the shared data storing files 5002. How to use the stored shared data file list 13001 is described later.

Figure 13:
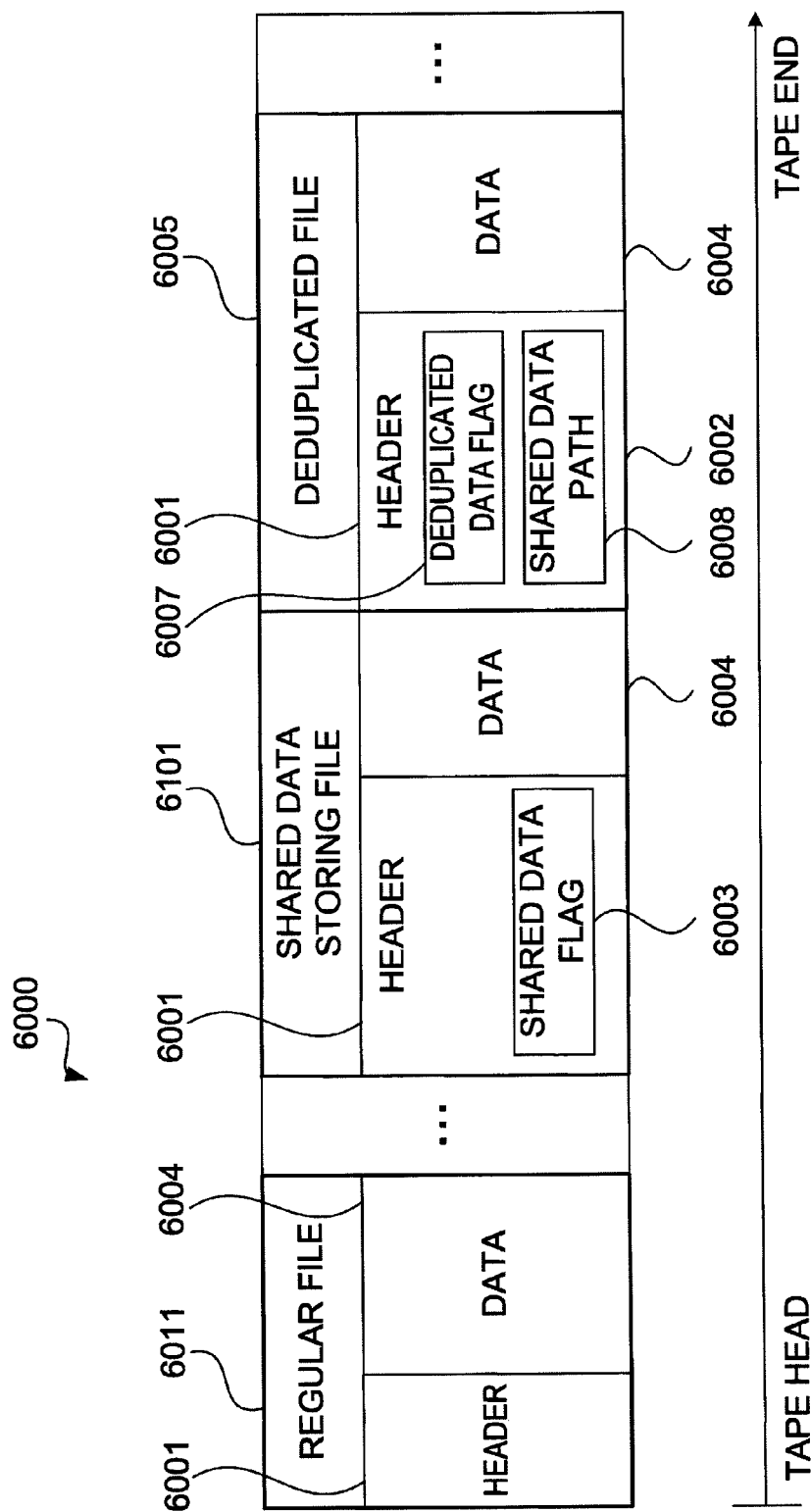
FIG. 13 is a diagram illustrating data structure stored in a tape of a tape device according to the second embodiment of this invention.

FIG. 13 is a diagram illustrating data structure stored in the tape 4105 of the tape device 1006 according to the second embodiment.

In the second embodiment, instead of placing the shared data storing files 5002 from the head of the tape as in the first embodiment, the shared data storing file 5002 as the reference destination is placed before the deduplicated file 5001 as the reference source. In the example illustrated in FIG. 13, the regular file 6011 is written at the head of the tape. Further, the deduplicated file 5001 written in the tape refers to the shared data storing file 5002. Therefore, in executing the backup process, the backup program 3107 writes the shared data storing file 5002 in the tape 4105 (6101), and then writes the deduplicated file 5001 as the reference source in the tape 4105 (6005).

Figure 14:
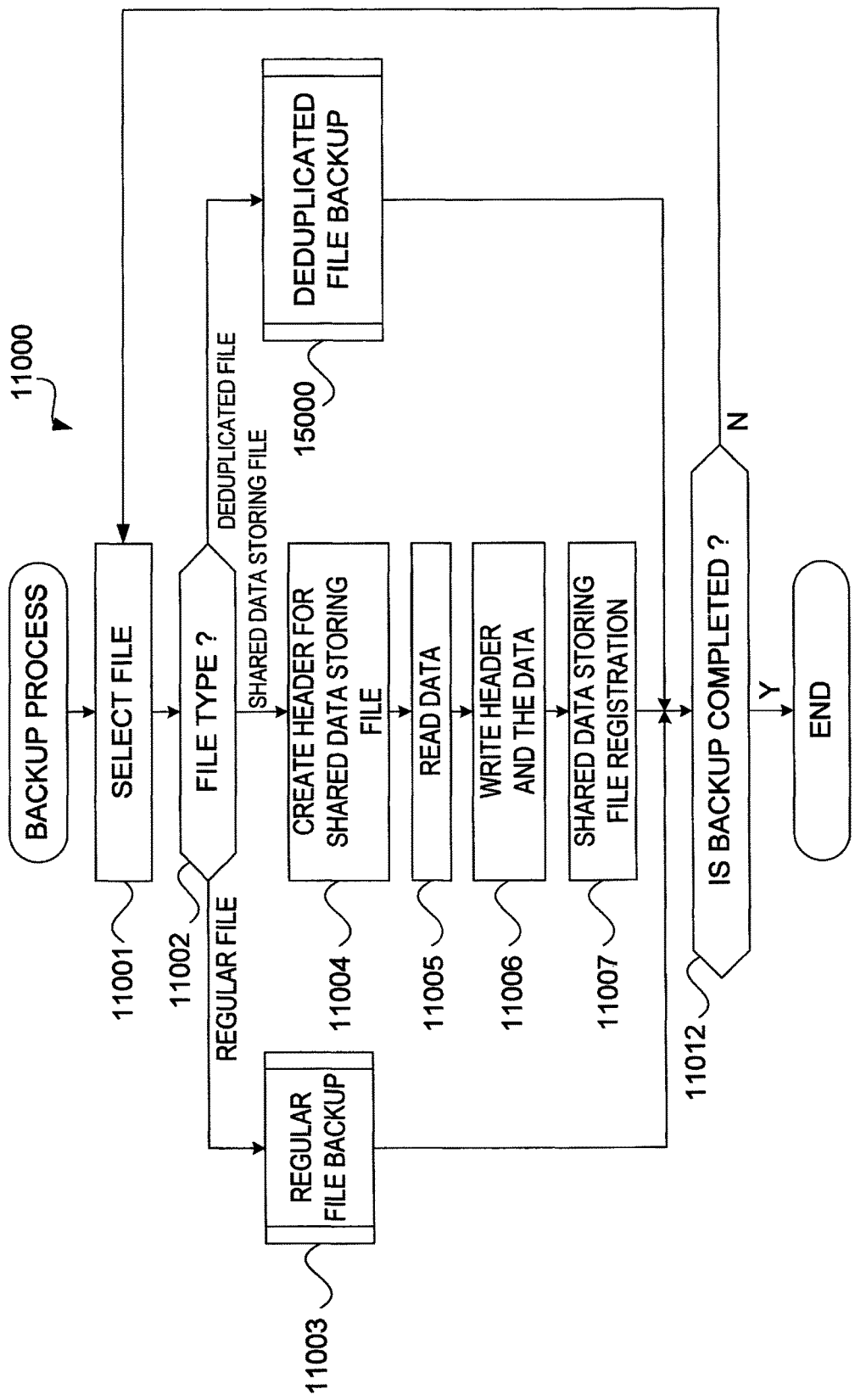
FIG. 14 is a flow chart of a backup process according to the second embodiment of this invention.

FIG. 14 is a flow chart of a backup process according to the second embodiment.

When receiving a backup request from the backup server program 2103 of the backup server 1002, the backup program 3107 selects one file from the disks (file system volumes) 4005 (Step 11001).

Then, the backup program 3107 determines the type of the selected file (Step 11002). In the case where it is found as the result of the determination that the selected file is a regular file, the backup program 3107 writes the file in the tape 4105 by the conventional backup process, that is, a method similar to the conventional method (Step 11003).

On the other hand, in the case where the selected file is a shared data storing file 5002, the backup program 3107 creates a header in which the shared data flag 6003 is set for the shared data storing file 5002 (Step 11004). Then, the backup program 3107 reads data of the file (Step 11005), and writes the created header and the read data in the tape 4105 (Step 11006). Then, the backup program 3107 registers a path of the shared data storing file 5002 in the stored shared data file list 13001 (Step 11007).

On the other hand, in the case where the selected file is a deduplicated file 5001, the backup program 3107 executes a deduplicated file backup process to be described later (Step 15000).

Thereafter, the backup program 3107 determines whether all the files stored in the disks 4005 are backed up (Step 11012). In the case that files are not stored in the tape 4105 ("N" in Step 11012), the backup program 3107 returns to Step 11001 to continue the process for the next file. On the other hand, in the case where all the files are stored in the tape 4105 ("Y" in Step 11012), the backup program 3107 ends the process.

Figure 15:
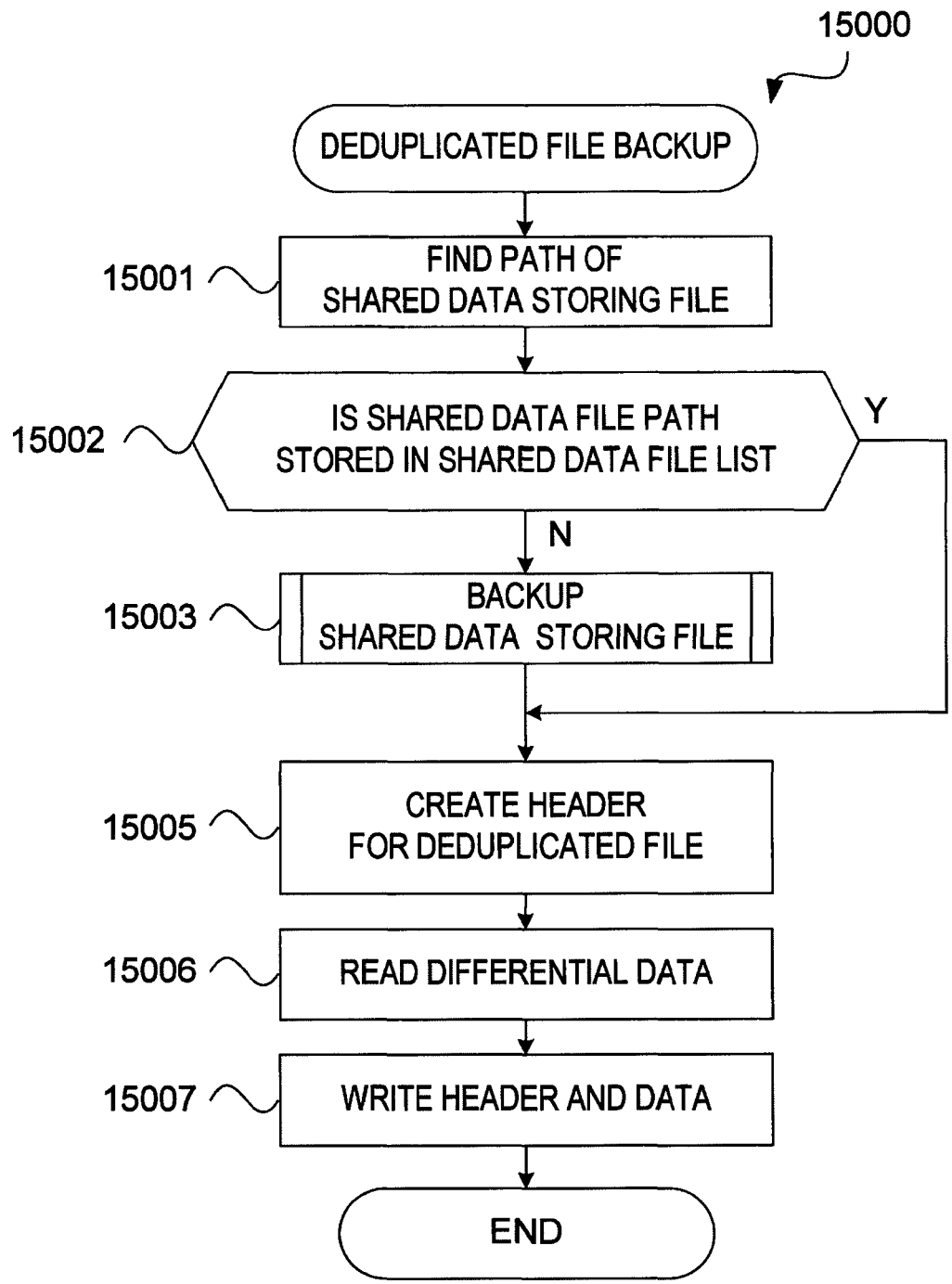
FIG. 15 is a flow chart of a deduplicated file backup process according to the second embodiment of this invention.

FIG. 15 is a flow chart of the deduplicated file backup process according to the second embodiment. The deduplicated file backup process illustrated in FIG. 15 is executed in Step 15000 of the backup process (FIG. 14).

First, the backup program 3107 finds the reference data of the shared data storing file 5002 to which the deduplicated file 5001 refers (Step 15001).

Then, the backup program 3107 searches the stored shared data file list 13001 to determine whether the shared data storing file is already stored in the tape 4105 (Step 15002). In the case where it is found as the result of the determination that the reference data found in Step 15001 is not stored in the stored shared data file list 13001, the backup program 3107 backs up the shared data storing file 5002 (Step 15003). This process is the same as the process of Steps 11004 to 11007 of the backup process (FIG. 14).

On the other hand, in the case where the found path is stored in the stored shared data file list 13001, the backup program 3107 proceeds to Step 15005 to create the header 6001 for the deduplicated file. Specifically, the backup program 3107 stores the deduplicated data flag 6007 and the path of the shared data storing file 5002 in the shared data path 6002 (Step 15005).

Then, the backup program 3107 reads the differential data 5008 of the deduplicated file 5001 (Step 15006). Finally, the backup program 3107 writes the created header 6001 and the read differential data of the deduplicated file 5001 in the tape 4105 (Step 15007).

Through the operation of the backup program 3107 described above, when viewed from the head of the tape 4105, a reading position of the shared data storing file 5002 comes before a reading position of the deduplicated file 5001 corresponding to the shared data storing file 5002. Therefore, in sequentially reading the data from the head of the tape 4105, the shared data storing file 5002 is read before the deduplicated file 5001.

As described above, according to the second embodiment of this invention, in backing up the deduplicated file 5001, it is determined whether the shared data storing file 5002 is already written in the tape 4105. In the case where the shared data storing file 5002 is not written in the tape 4105, the shared data storing file 5002 is written in the tape before the deduplicated file 5001. Therefore, in executing the restoration, the shared data storing file 5002 is restored before the deduplicated file 5001, and hence the shared data storing files 5002 as the reference destination always exists when the deduplicated file 5001 is restored.

Therefore, the shared data storing files 5002 do not need to be written at the head of the tape, which eliminates the need to search the file system volumes at the time of backup and enables high-speed backup.

While the present invention has been described in detail and pictorially in the accompanying drawings, the present invention is not limited to such detail but covers various obvious modifications and equivalent arrangements, which fall within the purview of the appended claims.

The invention claimed is:

1. A computer system for backing up data, comprising:
a server for providing data to a client computer;
a first storage system for storing the data to be provided to the client computer; and
a second storage system for backing up the data stored in the first storage system,
wherein the first storage system stores deduplicated data, shared data and regular data which is not deduplicated;
wherein the second storage system performs sequential accessing, and such sequential accessing being performed faster than random accessing;
wherein the deduplicated data includes a first header and a first body, the first header includes a first type data representing that the data is deduplicated data and reference information associating the deduplicated data to the shared data, the first body includes differential data indicating a difference from the shared data;
wherein the shared data includes a second header and a second body, the second header includes a second type data representing that the data is the shared data, the second body includes the shared data which is shared by a plurality of portions of the deduplicated data;
wherein the server executes to backup deduplicated data from the first storage system to the second storage system after the shared data associated with the deduplicated data is backed up from the first storage system to the second storage system such that the shared data is positioned sequentially prior to the deduplicated data associated with the shared data;
wherein the server executes to restore the backup deduplicated data from the second storage system after the backup shared data associated with the backup deduplicated data is restored;
wherein the server determines a file type of a file to be backed up; and
wherein the server executes to backup the regular data from the first storage system to the second storage system after the shared data is backed up from the first storage system to the second storage system.

2. The computer system according to claim 1, wherein the server randomly determines a backup order of the regular data and the differential data.

3. The computer system according to claim 1, wherein the second storage system stores a plurality of portions of the shared data to be backed up, and stores a plurality of portions of the deduplicated data associated with the plurality of portions of the shared data after reading positions at which the plurality of portions of the shared data are stored.

4. The computer system according to claim 3, wherein the server refers to the first type data to extract the shared data to be backed up to the second storage system.

5. The computer system according to claim 1, wherein the server:
refers to the first type data to determine whether the data to be backed up to the second storage system is deduplicated data; and
in the case where the data to be backed up is deduplicated data, determines whether the shared data associated with the deduplicated data is stored in the second storage system, and
the second storage system stores the shared data, and then stores the deduplicated data at a reading position after a position at which the shared data is stored in the case where the shared data is not stored in the second storage system.

6. The computer system according to claim 1, wherein the server:
executes the sequential reading of the data stored in the second storage system;
refers to the read second type data to determine the type of the data to be stored in the first storage system;

obtains the reference information from the second storage system in the case where the data to be stored in the first storage system is deduplicated data;

creates a pointer to the shared data from the reference information associating the deduplicated data to the shared data; and creates the differential data of the deduplicated data from the data read from the second storage system; and wherein the first storage system stores the created differential data.

7. A server for providing data to a client computer, the server being in communication to a first storage system and a second storage system and comprising:

a processor for executing a program; and a memory for storing the program executed by the processor, wherein the first storage system stores deduplicated data, shared data and regular data which is not deduplicated;

wherein the second storage system performs sequential accessing, such sequential accessing being performed faster than random accessing;

wherein the deduplicated data includes a first header and a first body, the first header includes a first type data representing that the data is deduplicated data and reference information for associating the deduplicated data to the shared data, the first body includes differential data indicating a difference from the shared data;

wherein the shared data includes a second header and a second body, the second header includes a second type data representing that the data is the shared data, the second body includes the shared data which is shared by a plurality of portions of the deduplicate data; and wherein the server is configured to:

backup deduplicated data from the first storage system to the second storage system after the shared data associated with the deduplicated data is backed up from the first storage system to the second storage system such that the shared data is positioned sequentially prior to the deduplicated data associated with the shared data;

restore the backup deduplicated data from the second storage system after the backup shared data associated with the backup deduplicated data is restored;

determine a file type of a file to be backed up; and execute to backup the regular data from the first storage system to the second storage system after the shared data is backed up from the first storage system to the second storage system.

8. The server according to claim 7, wherein the server is further configured to determines a backup order of the regular data and the differential data randomly.

9. The server according to claim 7, wherein the server is further configured to store a plurality of portions of the shared data to be backed up into the second storage system, and store a plurality of portions of the deduplicated data associated with the plurality of portions of the shared data into the second storage system after reading positions at which the plurality of portions of the shared data are stored.

10. The server according to claim 9, wherein the server refers to the first type data to extract the shared data to be backed up into the second storage system.

11. The server according to claim 7, wherein the server is further configured to:

refer to the first type data to determine whether the data to be backed up to the second storage system is deduplicated data;

in the case where the data to be backed up is deduplicated data, determine whether the shared data associated with the deduplicated data is stored in the second storage system; and store the shared data into the second storage system, and then store the deduplicated data into the second storage system at a reading position after a position at which the shared data is stored in the case where the shared data is not stored in the second storage system.

12. The server according to claim 7, wherein the server is further configured to:

execute the sequential reading of the data stored in the second storage system;

refer to the read second type data to determine the type of the data to be stored in the first storage system;

obtain the reference information from the second storage system in the case where the data to be stored in the first storage system is deduplicated data;

create a pointer to the shared data from the reference information associating the deduplicated data to the shared data;

create the differential data of the deduplicated data from the data read from the second storage system; and store the created differential data in the first storage system.

13. A data management method performed in a computer system, the computer system including a server for providing data to a client computer, a first storage system for storing the data to be provided to the client computer, and a second storage system for backing up the data stored in the first storage system, the first storage system stores deduplicated data, shared data and regular data which is not deduplicated, the second storage system providing sequential accessing, and the first storage system does not perform sequential accessing, the deduplicated data includes a first header and a first body, the first header includes a first type data representing that the data is the deduplicated data and reference information for associating the deduplicated data to the shared data, the first body includes differential data indicating a difference from the shared data, and the shared data includes a second header and a second body, the second header includes a second type data representing that the data is the shared data, the second body includes the shared data which is shared by a plurality of portions of the deduplicated data, the data management method including the steps of:

backing up deduplicated data from the first storage system to the second storage system after the shared data associated with the deduplicated data is backed up from the first storage system to the second storage system such that the shared data is positioned sequentially prior to the deduplicated data associated with the shared data;

restoring the backup deduplicated data from the second storage system after the backup shared data associated with the backup deduplicated data is restored;

determining a file type of a file to be backed up; and executing to backup the regular data from the first storage system to the second storage system after the shared data is backed up from the first storage system to the second storage system.

14. The data management method according to claim 13, further including the steps of determining a backup order of the regular data and the differential data randomly.

15. The data management method according to claim 13, further including the steps of storing, by the second storage system, a plurality of portions of the shared data to be backed up, and storing a plurality of portions of the deduplicated data associated with the plurality of portions of the shared data after reading positions at which the plurality of portions the shared data are stored.

16. The data management method according to claim 15, further including the step of referring, by the server, to the first type data to extract the shared data to be backed up into the second storage system.

17. The data management method according to claim 13, further including the step of:
    referring, by the server, to the first type data to determine whether the data to be backed up to the second storage system is deduplicated data;
    in a case where the data to be backed up is deduplicated data, determining, by the server, whether the shared data associated with the deduplicated data is stored in the second storage system; and
    storing, by the second storage system, the shared data and then storing the deduplicated data at a reading position after a position at which the shared data is stored in the case where the shared data is not stored in the second storage system.

18. The data management method according to claim 13, further including the steps of:
    executing, by the server, the sequential reading of the data stored in the second storage system;
    referring, by the server, to the read second type data to determine the type of the data to be stored in the first storage system;
    obtaining, by the server, the reference information from the second storage system in the case where the data to be stored in the first storage system is deduplicated data;
    creating, by the server, a pointer to the shared data from the reference information associating the deduplicated data to the shared data;
    creating, by the server, the differential data of the deduplicated data from the data read from the second storage system; and
    storing, by the first storage system, the created differential data.

* * * * *